(12) United States Patent
Yoshimaru et al.

(10) Patent No.: US 8,073,312 B2
(45) Date of Patent: Dec. 6, 2011

(54) RECORDER EQUIPPED WITH DUBBING FUNCTION

(75) Inventors: Takashi Yoshimaru, Kokubunji (JP); Maki Furui, Tokyo (JP); Hiroaki Ono, Fujisawa (JP); Katsuyuki Watanabe, Mito (JP); Kyuichirou Nagai, Fujisawa (JP); Hidekazu Takeda, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 680 days.

(21) Appl. No.: 11/063,591

(22) Filed: Feb. 24, 2005

(65) Prior Publication Data
US 2005/0265169 A1  Dec. 1, 2005

(30) Foreign Application Priority Data
May 31, 2004  (JP) ................................. 2004-161779

(51) Int. Cl.
*H04N 5/76* (2006.01)
(52) U.S. Cl. ........................................ 386/291; 386/295
(58) Field of Classification Search .................. 348/460, 348/563; 369/30.19, 47.12, 85; 379/67.1; 386/46, 83, 125
See application file for complete search history.

(56) References Cited

U.S. PATENT DOCUMENTS

| | | | | |
|---|---|---|---|---|
| 5,453,793 A * | 9/1995 | Kim | ................................ | 348/460 |
| 6,327,417 B1 * | 12/2001 | Hanai et al. | ..................... | 386/46 |
| 6,885,809 B1 * | 4/2005 | Asada | ............................. | 386/46 |
| 2002/0080277 A1 * | 6/2002 | Kida et al. | ..................... | 348/553 |
| 2002/0174430 A1 * | 11/2002 | Ellis et al. | ........................ | 725/46 |
| 2002/0191954 A1 * | 12/2002 | Beach et al. | ..................... | 386/46 |
| 2003/0194200 A1 * | 10/2003 | Yuen et al. | ....................... | 386/46 |
| 2004/0109675 A1 * | 6/2004 | Tsukidate | ......................... | 386/83 |
| 2004/0228609 A1 * | 11/2004 | Nakamura | ....................... | 386/46 |
| 2005/0160454 A1 * | 7/2005 | Hanai et al. | ..................... | 725/39 |
| 2007/0070828 A1 * | 3/2007 | Watanabe et al. | .......... | 369/30.19 |
| 2007/0172212 A1 * | 7/2007 | Miyagawa | ..................... | 386/125 |
| 2007/0206732 A1 * | 9/2007 | Ito et al. | ........................ | 379/67.1 |

FOREIGN PATENT DOCUMENTS

| | | |
|---|---|---|
| CN | 1375991 A | 9/2002 |
| CN | 1407805 A | 3/2003 |
| JP | 2001-045418 | 2/2001 |
| JP | 3088367 | 6/2002 |
| JP | 2003-087675 | 3/2003 |
| JP | 2004-80507 | 3/2004 |
| JP | 2004-127470 | 4/2004 |

* cited by examiner

*Primary Examiner* — William Vaughn, Jr.
*Assistant Examiner* — Gelek W Topgyal
(74) *Attorney, Agent, or Firm* — Antonelli, Terry, Stout & Kraus, LLP.

(57) ABSTRACT

A recording condition and a dubbing condition of a desired program that is to be broadcast are designated by using a remote controller. These conditions are stored in the information storage unit. In accordance with the recording condition, a controller permits a tuner to receive a program for which unattended recording is designated, and to record the program on an HDD. When a DVD is set in a dubbing unit and the dubbing operation is instructed by using the remote controller, a recorded program for which a dubbing condition stored in the information storage unit is applied can be dubbed. Then, the information for this program is displayed on a monitor so as to confirm the program and the dubbing condition, and to examine or correct CM skip if the CM skip is included in the dubbing condition. Thereafter, the dubbing operation is performed.

4 Claims, 16 Drawing Sheets

FIG.11

RECORDED PROGRAM INFORMATION 69

| 70a | 70b | 70c | 70d | 70e | 70f | 70g | |
|---|---|---|---|---|---|---|---|
| RECORDED VIDEO DATA | PROGRAMMING ID 1 | PROGRAM A | EPISODE 1 | IMAGE QUALITY (nn bps) | OCT. 10, 2000 1CH 20:00 - 20:45 | OTHER PROGRAM INFORMATION | |
| RECORDED VIDEO DATA | PROGRAMMING ID 2 | PROGRAM B | EPISODE 5 | IMAGE QUALITY (nn bps) | OCT. 11, 2000 3CH 20:00 - 20:45 | OTHER PROGRAM INFORMATION | |
| RECORDED VIDEO DATA | PROGRAMMING ID 3 | PROGRAM C | | IMAGE QUALITY (nn bps) | OCT. 14, 2000 4CH 20:00 - 20:45 | OTHER PROGRAM INFORMATION | RECORDING CONDITION [GENRE : MOVIE] |
| RECORDED VIDEO DATA | PROGRAMMING ID 1 | PROGRAM A | EPISODE 2 | IMAGE QUALITY (nn bps) | OCT. 17, 2000 1CH 20:00 - 20:45 | OTHER PROGRAM INFORMATION | |
| RECORDED VIDEO DATA | PROGRAMMING ID 2 | PROGRAM B | EPISODE 6 | IMAGE QUALITY (nn bps) | OCT. 18, 2000 3CH 20:00 - 20:45 | OTHER PROGRAM INFORMATION | RECORDING CONDITION [GENRE : MOVIE] |
| RECORDED VIDEO DATA | PROGRAMMING ID 4 | PROGRAM D | | IMAGE QUALITY (nn bps) | OCT. 19, 2000 6CH 20:00 - 20:45 | OTHER PROGRAM INFORMATION | RECORDING CONDITION [GENRE: MUSIC PROGRAM] & [PERFORMER : TARO ROKUGA] |
| RECORDED VIDEO DATA | PROGRAMMING ID 5 | PROGRAM E | | IMAGE QUALITY (nn bps) | OCT. 22, 2000 8CH 20:00 - 20:45 | OTHER PROGRAM INFORMATION | |
| RECORDED VIDEO DATA | PROGRAMMING ID 1 | PROGRAM A | EPISODE 3 | IMAGE QUALITY (nn bps) | OCT. 24, 2000 1CH 20:00 - 20:45 | OTHER PROGRAM INFORMATION | RECORDING CONDITION [GENRE: MUSIC PROGRAM] & [PERFORMER : HANAKO ROKUGA] |
| RECORDED VIDEO DATA | PROGRAMMING ID 6 | PROGRAM F | | IMAGE QUALITY (nn bps) | OCT. 25, 2000 10CH 19:00 - 19:45 | OTHER PROGRAM INFORMATION | |
| RECORDED VIDEO DATA | PROGRAMMING ID 2 | PROGRAM B | EPISODE 7 | IMAGE QUALITY (nn bps) | OCT. 25, 2000 6CH 20:00 - 20:45 | OTHER PROGRAM INFORMATION | |
| RECORDED VIDEO DATA | PROGRAMMING ID 1 | PROGRAM A | EPISODE 4 | IMAGE QUALITY (nn bps) | OCT. 31, 2000 1CH 20:00 - 20:45 | OTHER PROGRAM INFORMATION | |
| RECORDED VIDEO DATA | PROGRAMMING ID 2 | PROGRAM B | EPISODE 8 | IMAGE QUALITY (nn bps) | OCT. 01, 2000 3CH 20:00 - 20:45 | OTHER PROGRAM INFORMATION | |
| RECORDED VIDEO DATA | PROGRAMMING ID 1 | PROGRAM A | EPISODE 5 | IMAGE QUALITY (nn bps) | OCT. 07, 2000 1CH 20:00 - 20:45 | OTHER PROGRAM INFORMATION | |
| RECORDED VIDEO DATA | PROGRAMMING ID 2 | PROGRAM B | EPISODE 9 | IMAGE QUALITY (nn bps) | OCT. 08, 2000 3CH 20:00 - 20:45 | OTHER PROGRAM INFORMATION | |

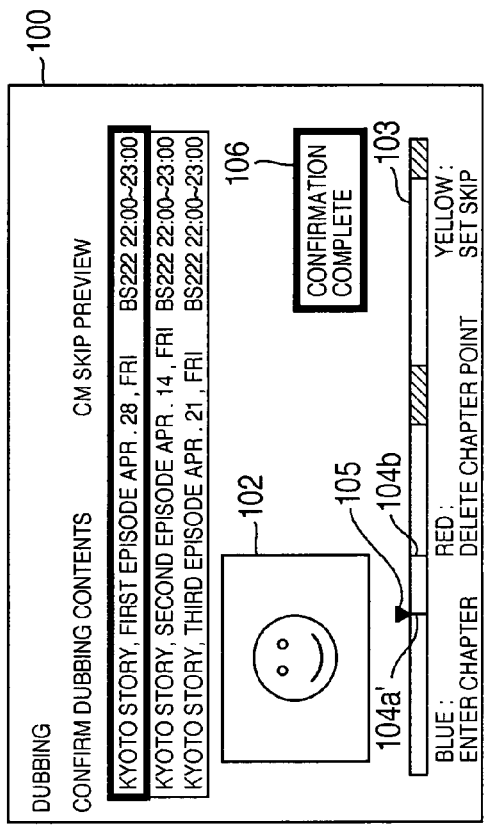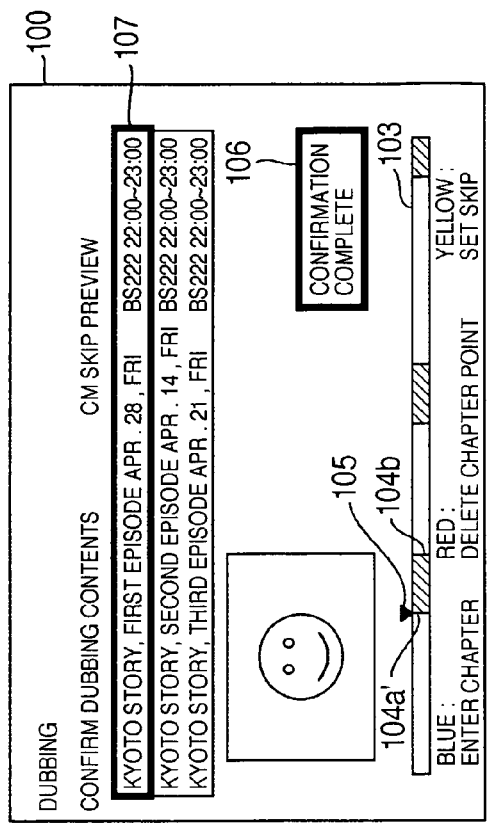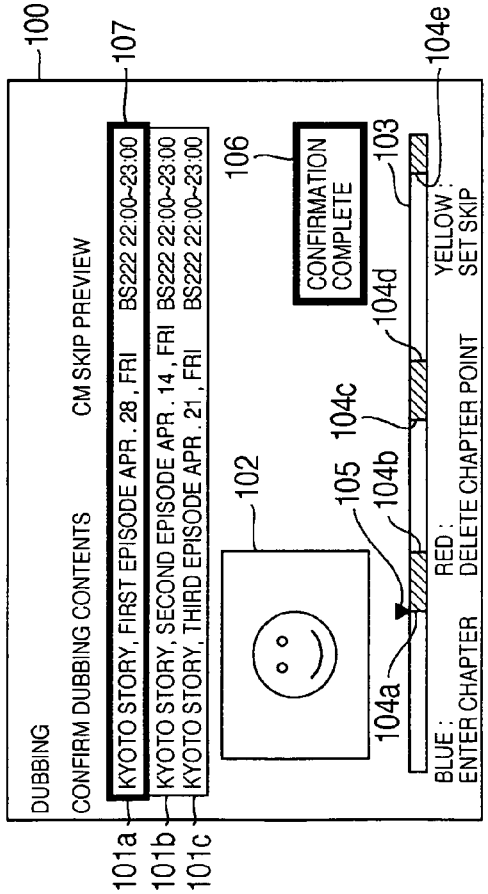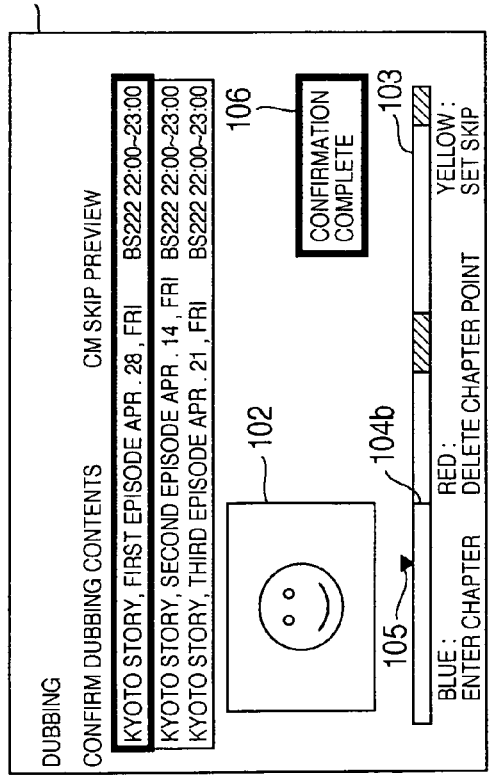

RECORDER EQUIPPED WITH DUBBING FUNCTION

CLAIM OF PRIORITY

The present application claims priority from Japanese application JP 2004-161779 filed on May 31, 2004, the content of which is hereby incorporated by reference into this application.

BACKGROUND OF THE INVENTION

The present invention relates to a recorder, equipped with a hard disk (hereinafter referred to as an HDD), for which a dubbing function is provided that can dub to a removable (detachable) recording medium, such as a DVD, a broadcast program recorded on the hard disk.

Conventionally, a technique is proposed whereby a broadcasting program recorded on a hard disk can be dubbed to a removable recording medium (see, for example, Japanese Patent Laid-Open Publication No. JP-A-2004-127470).

This is a technique for dubbing, to an optical disk, a desired broadcasting program selected from among programs recorded on a hard disk. According to this technique, first, the title names and the recording modes for recorded broadcast programs are obtained from the hard disk, and a dubbing designation screen is displayed that is based on the title names, the recording modes and the disk management information stored in memory for the optical disk. Then, using the dubbing designation screen, a broadcast program to be dubbed, an optical disk at a dubbing destination and a recording mode for the optical disk are selected. Subsequently, data provided for the broadcast programs recorded on the hard disk are employed, and the designated broadcast program is dubbed using the recording mode selected for the designated optical disk.

The recording mode is used to determine a recording data rate for an optical disk. When the recording mode differs from the one used for recording data on the hard disk, a data expansion unit or a data compression unit is employed to match the data recording rate for the optical disk having the data rate in the designated recording mode.

When one optical disk is not enough for the dubbing of the designated program during the designated recording mode, another optical disk is added to continue the dubbing. Therefore, a plurality of optical disks are prepared.

However, according to the invention disclosed in Japanese Patent Laid-Open Publication No. JP-A-2004-127470, a dubbing instruction operation is required for each of the programs recorded on the hard disk. Thus, also for a program, such as a serial drama play, that is broadcast at the same time slot at every predetermined interval, a dubbing instruction operation is required each time a program is received and recorded at the time slot. This requires user effort and time.

Furthermore, since a dubbing instruction operation is performed only for a program that has been recorded on the hard disk, a program that is not recorded can not be dubbed. In the case of the program described above, which is broadcast at the same time slot each time a predetermined interval has elapsed, if the recording of a program is missed one time, the serial program is interrupted, and also, the dubbing of this program must not be skipped even once. In addition, when a plurality of broadcasts of a serial program are to be dubbed at one time, these broadcasts must be searched for on a dubbing designation screen. This also requires user effort and time.

SUMMARY OF THE INVENTION

It is one objective of the present invention to provide a recorder with a dubbing function that resolves the above problems, and that in particular reduces the labor required to dub a serial program that is broadcast at the same time slot each time a predetermined interval elapses, so a to improve the usability.

To achieve this objective, according to the present invention, a recorder having a dubbing function comprises:

a hard disk on which received broadcast programs are to be recorded;

a dubbing unit for dubbing to removable recording media the broadcast programs recorded on the hard disk;

a first unit for designating a condition for recording, on the hard disk, a scheduled broadcast program that is selected as a scheduled recording program, and for performing a setting for the selected scheduled recording program; and a second unit for designating a condition during which, from the hard disk, the scheduled recording program set by the first unit is to be dubbed to the removable recording medium, wherein, for a program pack consisting of a series of programs that are broadcast across the same channel, with the same program title, in the same time slot each time a predetermined interval has elapsed, the first unit permits the recording condition for the series of programs to be collectively designated.

The first unit permits, as a recording condition, the provision of numbers that indicate the recording order for each program in the series that forms the program pack.

The second unit permits, as a dubbing condition, the division into predetermined segments the series of programs that constitutes the program pack, and the dubbing of programs in the same segment to a single removable recording medium.

According to the present invention, the condition for the dubbing of a program can be designated at the same time the recording of the program is set, a desired program can be appropriately dubbed, and for a program pack, such as a serial drama consisting of a series of programs, a recording condition and a dubbing condition need only be designated for the first broadcast program in the pack to set the recording condition and the dubbing condition for all the programs. Therefore, the labor and time required to repeatedly perform a setting operation for the same recording condition and the same dubbing condition can be eliminated, and the usability can be greatly improved.

Other objects, features and advantages of the invention will become apparent from the following description of the embodiments of the invention taken in conjunction with the accompanying drawings.

BRIEF DESCRIPTION OF THE DRAWINGS

FIG. 11 is a diagram showing example recorded program information that is prepared by the DVD recorder equipped with a hard disk shown in FIG. 1;

FIGS. 17A to 17D are diagrams showing an example CM skip preview screen displayed on the monitor of the DVD recorder equipped with a hard disk shown in FIG. 1, and an example operation for correcting a CM skip area on this CM skip preview screen;

DESCRIPTION OF THE EMBODIMENT

Figure 1:
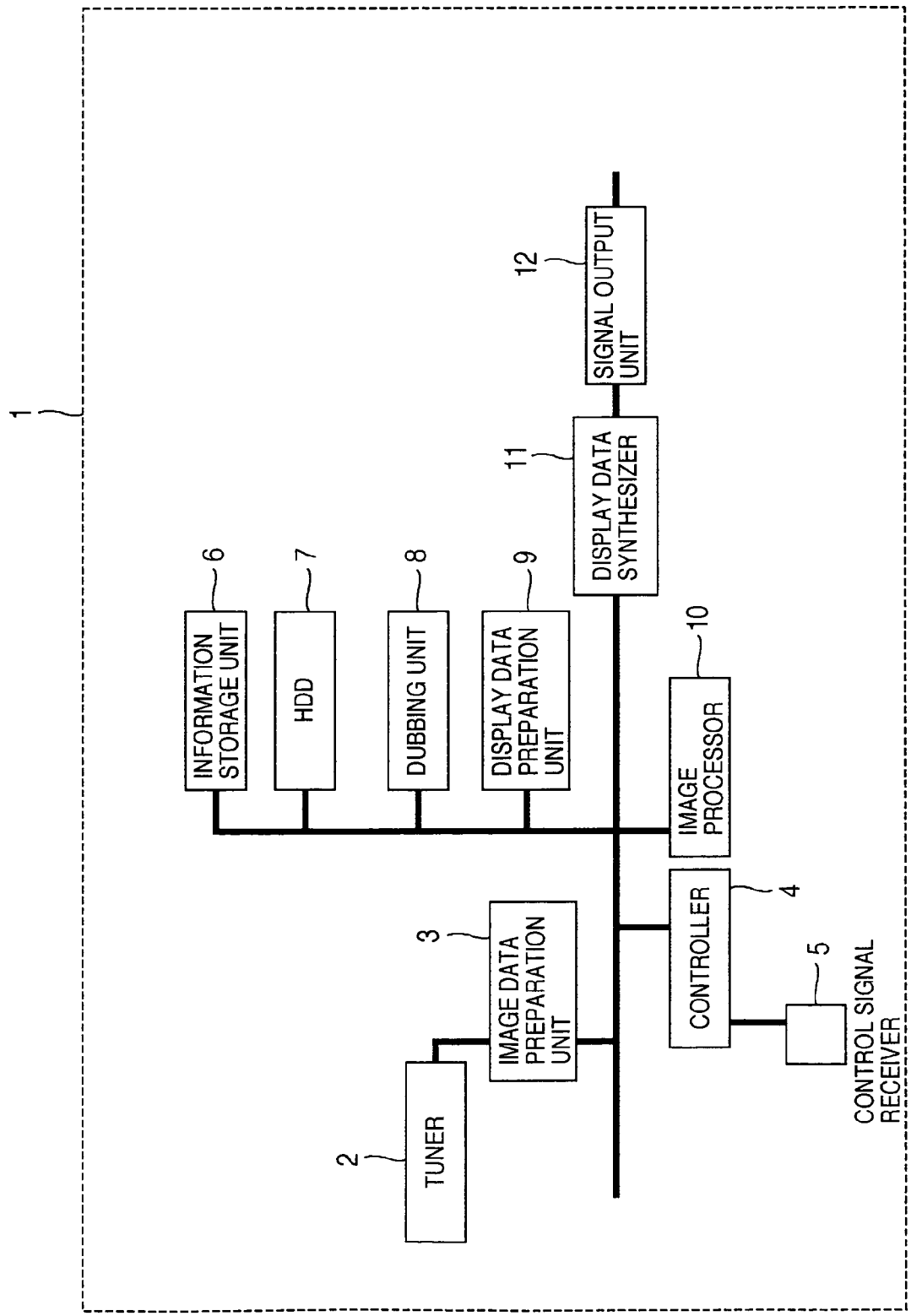
FIG. 1 is a block diagram showing a DVD recorder equipped with a hard disk according to one embodiment of the present invention.

FIG. 1 is a block diagram showing an example configuration for a DVD recorder equipped with a dubbing function according to one embodiment of the present invention. In this embodiment, a recorder 1 having a dubbing function comprises: a tuner 2, an image data preparation unit (decoder) 3, a controller 4, a control signal receiver 5, an information storage unit 6, an HDD (hard disk drive) 7, a dubbing unit 8, a display data preparation unit 9, an image processor 10, a display data synthesizer 11, and a signal output unit 12.

In FIG. 1, the control signal receiver 5 receives control signals in consonance with the manipulation of a remote controller (not shown) or the operation console of the recorder 1 in this embodiment, and supplies the control signals to the controller 4. The controller 4 is constituted by a CPU (Central Processing Unit), for example, and controls the individual sections in accordance with control signals received by the control signal receiver 5. In the following explanation, the control signal receiver 5 receives control signals from the remote controller.

The tuner 2 receives broadcast programs and program information, such as a program table, in accordance with the manipulation of the remote controller. The image data preparation unit 3 decodes the broadcast programs, and detailed information therefor, and the program table information that have been received, and while the broadcast programs are stored on the HDD 7, the program information is stored in the information storage unit 6. The dubbing unit 8 is used to dub a broadcast program recorded on the HDD 7 to a removable recording medium, such as a DVD (Digital Versatile Disk), and in the following explanation, a DVD is employed as a recording medium for dubbing. The information storage unit 6 may be part of the HDD 7.

By manipulating the remote controller, the unattended recording on the HDD 7 of a broadcast program desired by a user can be set, or the dubbing unit 8 can be set for the unattended dubbing to a DVD of a broadcast program recorded on the HDD 7. The programming information for the unattended recording and the unattended dubbing and the programming screen information used for such programming are also recorded in the information storage unit 6. When the information for the unattended recording of a desired broadcasting program is stored in advance in the information storage unit 6, the controller 4 employs this information to permit the tuner 2 to receive the desired broadcast program on a scheduled broadcast date. Then, as is described above, the image data preparation unit 3 decodes the received broadcast program and records the decoded program on the HDD 7.

When information for the unattended dubbing of a desired program stored on the HDD 7 is recorded in the information storage unit 6, the controller 4 employs this information to read the desired broadcast program from the HDD 7 and the dubbing unit 8 dubs the program to the DVD. In this case, in accordance with the dubbing condition included in the unattended dubbing information, the image processor 10 reduces the volume of the data for the broadcast program read from the HDD 7, and the dubbing unit 8 dubs the program to the DVD. The deterioration of image quality can not be avoided when the data volume reduction process is performed, however, more broadcast programs can be dubbed to a DVD, and for a program (hereinafter referred to as a serial program), such as a serial drama, that is broadcast during the same time slot each time a predetermined interval has elapsed, a plurality of broadcasts can be dubbed to a single DVD. When the time designated for dubbing to a DVD is the same as that designated for unattended recording, the recording condition under which a remote controller 13 (see FIG. 2) is employed for the unattended recording can also be designated, so that the image processor 10 reduces the data volume for a received broadcast program and stores the program on the HDD 7.

To program the unattended recording or the unattended dubbing, a broadcasting program schedule and screen information for the programming are read from the information storage unit 6, and the display data preparation unit 9 converts these data into screen display data and transmits the obtained data, via the display data synthesizer 11 and the signal output unit 12, to a monitor (not shown), such as a television receiver. When data are to be displayed on the screen (hereinafter referred to as a monitor screen) of a monitor on which other data are already displayed, the display data synthesizer 11 prepares a new screen that is superimposed on the previously displayed screen.

Figure 2:
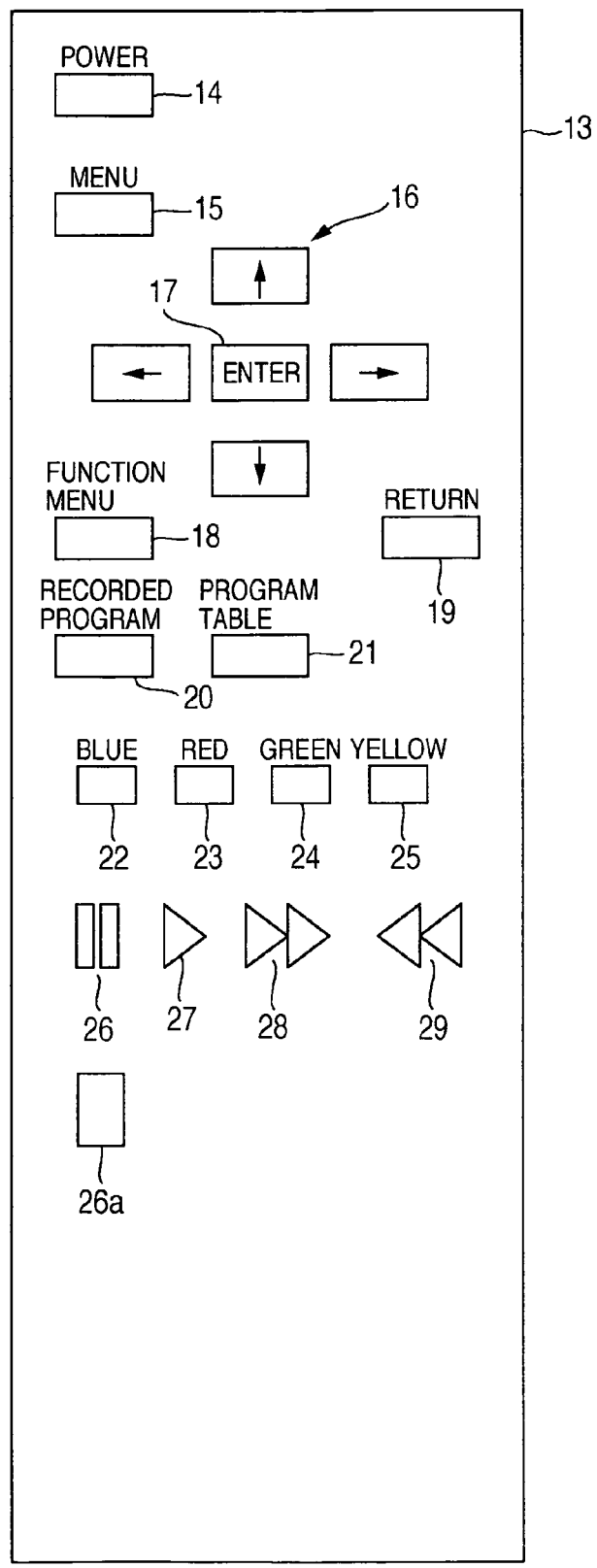
FIG. 2 is a front view of an example remote controller employed as control means for the DVD recorder equipped with a hard disk shown in FIG. 1.

FIG. 2 is a front view of an example remote controller that serves as control means for the DVD recorder 1 having a dubbing function shown in FIG. 1. In this example, a remote controller 13 comprises: a power button 14, a menu button 15, arrow keys 16, an enter button 17, a function menu button 18, a return button 19, a recorded program button 20, a program guide button 21, a colored (blue) button 22, which also serves as a chapter enter button, a colored (red) button 23, which also serves as a chapter cancel button, a colored (green) button 24, a colored (yellow) button 25, which also serves as a skip setup button, a pause button 26, a stop button 26*a*, a play button 27, a fast forward button 28, and a reverse button 29.

In FIG. 2, when the power button 14 of the remote controller 13 is pressed, turning on the power, the menu button 15, the function menu button 18, the recorded program button 20 and the program guide button 21 become active.

The menu button 15 is used to select various operations, such as the recording of a broadcast program on the HDD 7 (FIG. 1) of the recorder 1, and playing of a program recorded on the HDD 7.

When the function menu button 18 is manipulated, the controller 4 of the recorder 1 in FIG. 1 reads function menu screen information from the information storage unit 6, and the display data preparation unit 9 prepares display data for a function menu screen and transmits the display data, via the display data synthesizer 11 and the signal output unit 12, to the monitor (not shown). The function menu screen, which will be described later, is displayed on the monitor screen, and when, on the function menu screen, the arrow keys 16 and the enter key 17 of the remote controller 13 in FIG. 2 are manipulated, a desired function can be selected and designated, and can be performed. In the following explanation, the selection and execution operation performed by manipulating the arrow keys 16 and the enter key 17 is called the remote controller 13 selection and execution operation.

The recorded program button 20 of the remote controller 13 is used to display a screen (which will be described later) on which the broadcast programs recorded on the HDD 7 (FIG. 1) of the recorder 1 is listed. The recorded program list information is stored in the information storage unit 6, and in the same manner as for the menu screen information, this information is read from the image information storage unit 6 and changed into display data by the display data preparation unit 9, and the resultant list information is displayed on the monitor screen. The program guide button 21 is used to read information for broadcast programs that have been received by the tuner 2 of the recorder 1 and stored in the information storage unit 6. The program table information thus read is processed in the same manner as are the menu screen information and the recorded program list information, and the resultant information is transmitted to the monitor. Then, the broadcast program table is displayed on the monitor screen.

The pause button 26, the stop button 26*a*, the play button 27, the fast forward button 28 and the reverse button 29 are operating keys for playing broadcast programs recorded on the HDD 7 (FIG. 1) of the recorder 1, or for performing reverse or fast forward operations for the programs. For example, in FIG. 17, on a CM skip preview screen 100 for the monitor, which will be described later, the play button 27, the fast forward button 28 and the reverse button 29 can be employed to perform normal playing, reverse playing and fast forward playing.

As will be described later, when the dubbing unit 8 (FIG. 1) of the recorder 1 is to dub, to a DVD, a desired program recorded on the HDD 7 (FIG. 1), the dubbing condition can be designated so as to skip CMs (commercials broadcast during the program). At this time, from among the colored buttons 22 to 25 used for digital broadcast, the colored buttons 22, 23 and 25 are used to correct a CM skip range.

More specifically, as will be described later, the CM skip range is defined by chapters, and an interval between the two adjacent chapters is defined as the CM skip range. In this embodiment, the colored (blue) button 22 is used also as a chapter enter button, the colored (red) button 23 is used also as a chapter cancel button, and the colored (yellow) button 25 is also used as a CM skip setup button. Assuming, as is described above, that a CM skip is designated in advance as the dubbing condition, a chapter is designated for a recorded program for which the dubbing condition is applied, and the CM skip range is automatically set up. However, the setup location of the chapter can be changed by using the colored (blue) button 22 that also serves as a chapter enter button, the colored (red) button 23 that also serves as a chapter cancel button, and a new CM skip range can be set by the colored (yellow) button 25 that also serves as a skip setup button. In this case, the colored (blue) button 22, which is also used to enter a chapter, is a button colored blue, the colored (red) button 23, which is also used to cancel a chapter, is a button colored red, and the colored (yellow) button 25, which is also used to set up a skip, is a button colored yellow.

In this embodiment, the remote controller 13 can also be employed to receive a desired broadcast program and display the program on the monitor screen. However, the operating buttons for this operation are not shown in FIG. 2, and only the buttons related to the setting of programs, the unattended recording of programs and the unattended dubbing of programs are shown.

The operation for this embodiment will now be described by referring to the screens displayed on the monitor. The following operation is performed by the controller 4 in accordance with the manipulation of the remote controller 13.

Figure 3:
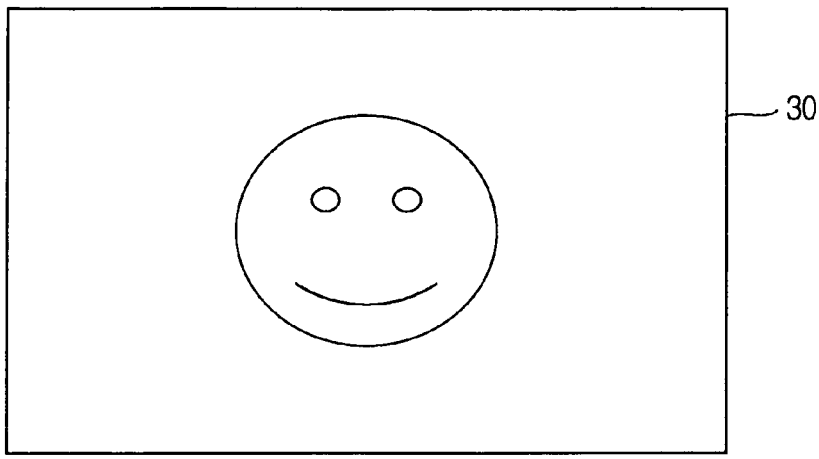
FIG. 3 is a diagram showing a broadcast program that currently is being received and is displayed on the monitor screen of the DVD recorder equipped with a hard disk in FIG. 1.

When the program guide button 21 of the remote controller 13 in FIG. 2 is manipulated while, as is shown in FIG. 3, a screen 30 for a currently received broadcast program is displayed, the program guide information is read from the information storage unit 6 in FIG. 1, and a program guide screen 40 is displayed on the monitor. A broadcast date 42, such as "Friday, April 28", a broadcast channel 43 and a pertinent broadcast program table 41, for example, are displayed on the program guide screen 40.

Figure 4:
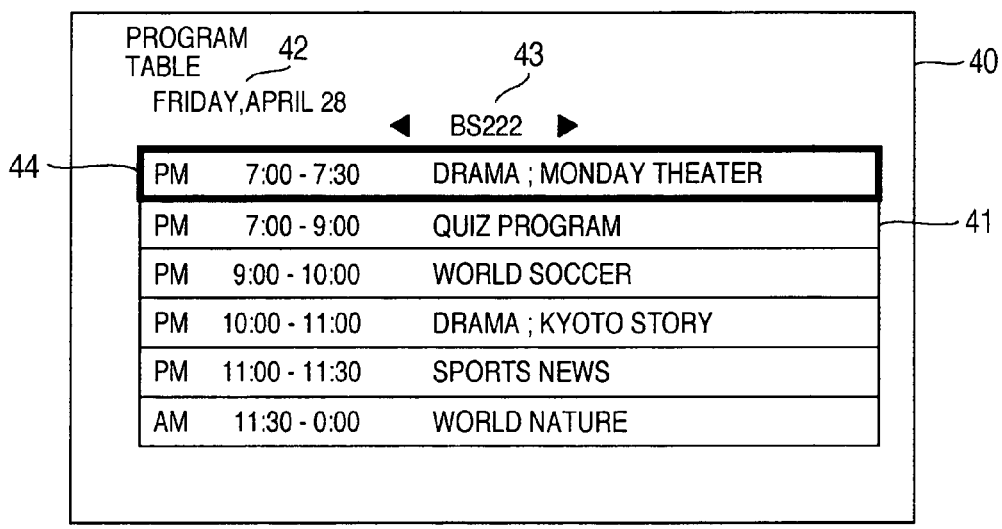
FIG. 4 is a diagram showing an example program schedule screen displayed on the monitor of the DVD recorder equipped with a hard disk in FIG. 1.

In the broadcast program table 41, broadcast programs scheduled for the same broadcast channel (BS222) on a predetermined broadcast date (Friday, April 28) are arranged in their broadcast order, and a time slot and a program title are presented for each of these programs, as shown in FIG. 4. A cursor 44 having a box shape is provided for one broadcast scheduled program (in this case, the first program as in the initial condition) on the broadcast program table 41, and this broadcast program is selected. By manipulating the up and down arrow keys 16 of the remote controller 13, the cursor 44 can be moved vertically across the broadcast program table 41, and on the table 41, an arbitrary program can be selected. When the cursor 44 is moved to the topmost or lowermost program on the broadcast program table 41, and the up and down arrow keys 16 of the remote controller 13 are manipulated and the broadcast program table 41 can be vertically scrolled for each broadcast program. Further, the broadcast date 42 can be changed by manipulating the left and right keys 16 of the remote controller 13, and after a new broadcast date has been designated, the broadcast channel 43 can be changed by manipulating the left and right keys 16. In this case, when a new broadcast channel is set, the enter key 17 need only be manipulated to change the broadcast date 42.

Figure 5:
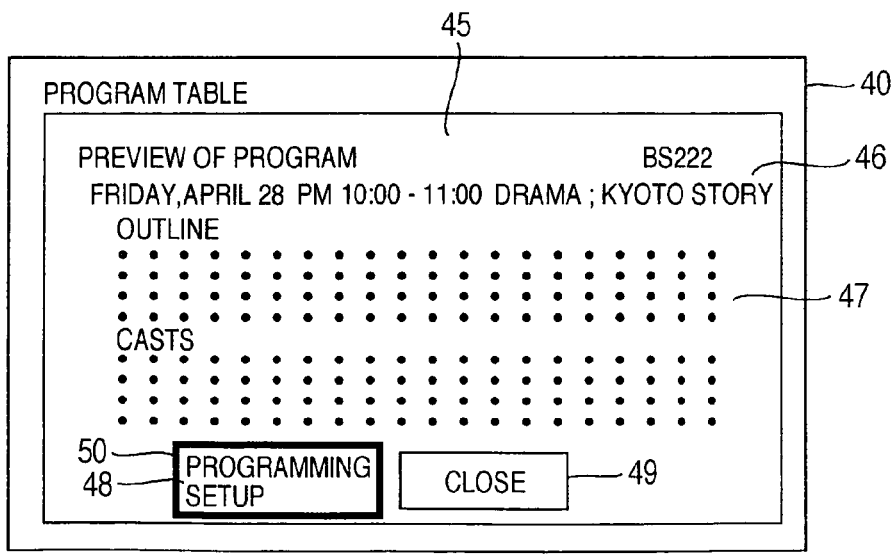
FIG. 5 is a diagram showing an example preview screen for a selected broadcast scheduled program that is displayed on the monitor of the DVD recorder equipped with a hard disk in FIG. 1.

When a desired scheduled broadcast program is selected on the program guide screen 40 by the selection and execution operation of the remote controller 13, as is shown in FIG. 5, a program information screen 45 for the selected program is displayed while superimposed on the program guide screen 40. Program related information 46, such as the broadcast day and time and the program title of the selected program, and program contents information 47, such as the casts and outline of the program, are displayed on the program information screen 45, so that the user can understand the overview of the selected program. The program contents information 47 is stored in correlation with the program table information. It should be noted that the program contents information 47 is not limited to the casts or the outline of the program, and may be other information related to the contents of the selected program.

A "programming setup" button 48 and a "close" button 49 are shown on the program preview screen 45, and generally, a cursor 50 having a box shape is provided for the "recording setup save" button 48. Through the selection and execution operation of the remote controller 13, the cursor 50 can be moved between the "recording setup save" button 48 and the "close" button 49, and either one of the buttons can be selected.

When the "close" button 49 is selected using the cursor 50, the program information screen 45 is closed, and only the program guide screen 40 in FIG. 4 is displayed. In this state, another scheduled broadcast program can be selected. When the "recording setup save" button 48 is selected using the cursor 50, an unattended recording setup operation is initiated for the scheduled broadcast program that has been selected on the program guide screen 40 and has been roughly explained on the program preview screen 45. In the unattended recording setup operation, first, an unattended recording setup screen 51 in FIG. 6 for setting a recording condition is displayed while being superimposed on the program guide screen 40.

It should be noted that after a specific broadcast program has been selected on the program guide screen 40, the screen may be shifted directly to the unattended recording setup screen 51.

A "program title" box 51a, a "channel" box 51b, a "broadcast day and time" box 51c, a "recording mode" box 51d, an "add serial number to title" box 51e, a "next number" box 51f and a "numbering form" box 51g are provided on the unattended recording setup screen 51, and these categories represent the conditions for the recording of the broadcasting program.

The title ("Drama: Kyoto Story" in this case) of a scheduled broadcast program, which is selected in the broadcast program table 41 on the program guide screen 40, is displayed in the "program title" box 51a. The broadcast channel ("BS222" in this case) of the scheduled broadcast program is displayed on the "channel" box 51b. The day and time ("PM 10:00-11:00", for a serial drama to be broadcast from 10:00 to 11:00 every Friday evening) for the broadcast scheduled program is displayed in the "broadcast day and time" box 51c. The contents of these boxes vary depending on the program selected, and when the unattended recording setup screen 51 is displayed, the contents thereof are determined. Especially for a serial program, such as a serial drama, that is broadcast each time a predetermined interval has elapsed, a recording condition need not be designated for each broadcast of the serial program, and a recording condition such as "PM 10:00-11:00 every Friday" need only be set one time for the entire serial program.

The "recording mode" box 51d is used to designate the image quality when the selected broadcasting scheduled program is to be recorded on the HDD 7, and a "high image quality" mode (the image quality of a program as received) is set as a default. However, as will be described later, when the dubbing unit 8 dubs a recorded program, the image quality is limited depending on the number of programs to be dubbed to a single DVD. When the same image quality as the one for dubbing is designated for recording, the image quality designated at the "recording mode" box 51d is changed.

The "add a serial number to a title" box 51e is used to designate whether a number is provided for each broadcast of a serial program or a broadcasting program related to the serial program. "Yes" and "No" can be selected, and "Yes" is designated as a default. When "Yes" is selected at the "add a serial number to a title" box 51e, the "next number" box 51f is used to designate a number to be provided for a broadcast to be recorded next. When "1" is designated and a new serial drama is to be recorded every week, "1" is provided for a first broadcast of the drama to be recorded, and "2" and succeeding numbers are sequentially provided for dramas to be recorded next. The "numbering form" box 51g is used to designate the form of numbering used for the "next number" box 51f, and is, for example, an episode (e.g., first episode), an installment (e.g., the first installment) or # (e.g., #1).

As is described above, a series of programs that is broadcast with the same title, through the same channel, at the same time slot and at every predetermined interval can be set at the "program title" box 51a, the "channel" box 51b and the "day and time" box 51c, so that this series of programs can be handled as a single pack (program pack). For this program pack, a recording condition need only be designated for the first broadcast, so that the same recording condition is set for the remaining programs in the program pack. The recording condition for the program pack that is designated on the unattended recording setup screen 40 is also a recording condition for a program to be recorded next. After the first broadcast program of the program pack has been recorded, the recording condition selected on the unattended recording setup screen 40 is applied for the next program to be recorded even when "1" is designated at the "next number" box 51f. Thus, the "next number" box 51f is automatically changed to "2". In this manner, each time a program included in the same program pack is recorded, the recording condition is automatically applied for a program to be recorded next, and the "next number" box 51f is updated.

By manipulating the remote controller 13, a cursor 55 in a box shape can be moved to the "add a serial number to a title" box 51e, the "next number" box 51f and the "numbering form" box 51g. When the enter key 17 is manipulated while the cursor 55 is positioned at one box, the contents designated at the pertinent box can be changed. For example, when the "add a serial number to a title" box 51e is selected by moving the cursor 55, and the enter key 17 is manipulated, the designated contents are changed to "Yes" or "No".

Figure 7:
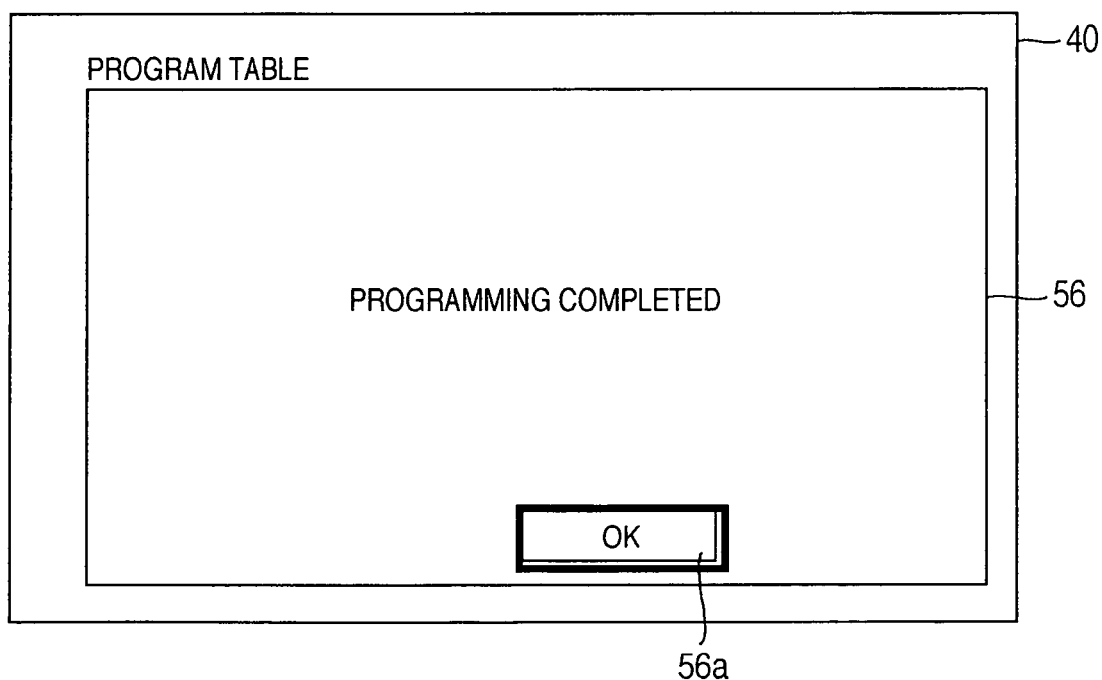
FIG. 7 is a diagram showing an example unattended recording setup complete screen displayed on the monitor of the DVD recorder equipped with a hard disk in FIG. 1.

A "recording setup save" button 52, a "dubbing save programming setup" button 53 and a "close" button 54 are also provided on the unattended recording setup screen 51. The "programming setup" button 52 is used to set the unattended recording conditions indicated on the boxes 51a to 51g. When the cursor 55 is moved to the "recording setup save" button 52 and this button is selected by the selection and execution operation of the remote controller 13, the unattended recording condition is designated, and an unattended recording setup complete screen 56 in FIG. 7 is displayed, with being superimposed on the unattended recording setup screen 51. An "OK" button 56a is displayed on the unattended recording setup complete screen 56. When the "OK" button 56a is selected by the enter key 17 of the remote controller 13, the screen is returned to the program guide screen 40 in FIG. 4, and unattended recording of the next broadcasting scheduled program can be set.

Figure 6:
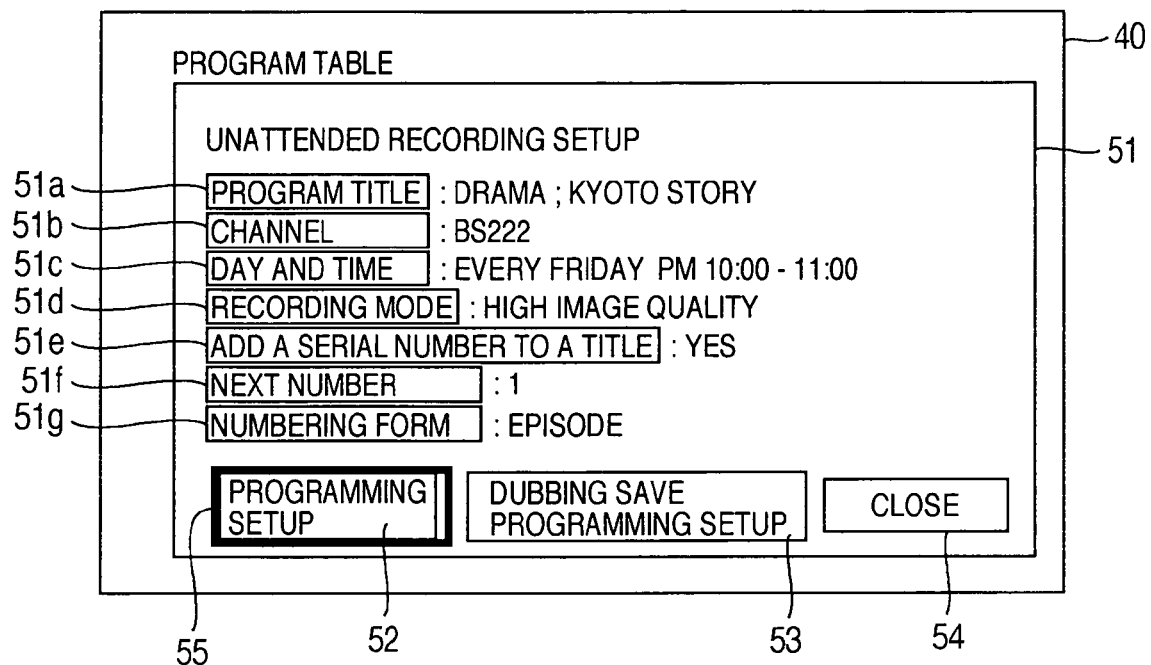
FIG. 6 is a diagram showing an example unattended recording setup screen displayed on the monitor of the DVD recorder equipped with a hard disk in FIG. 1.
Figure 8:
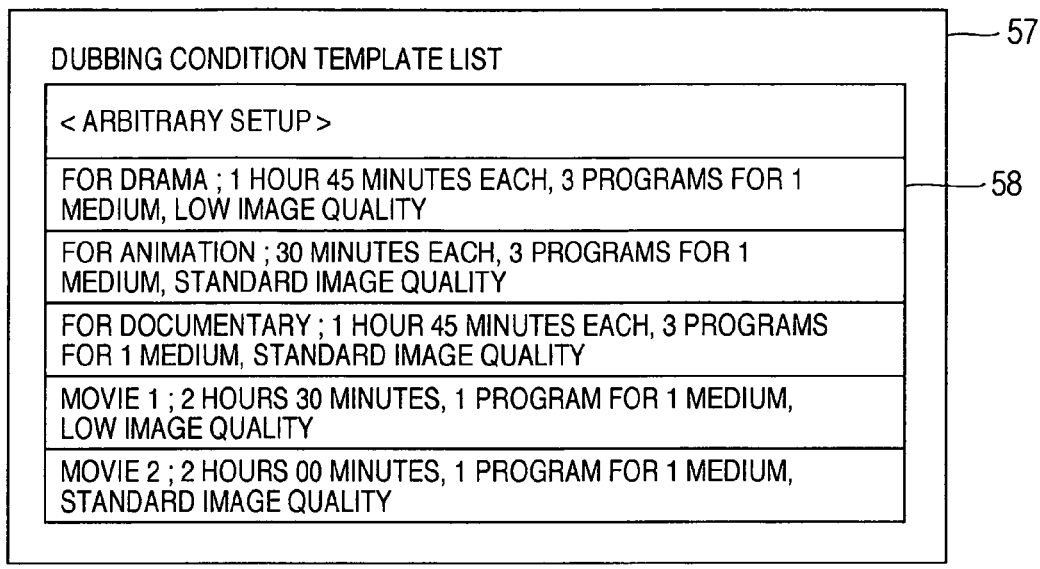
FIG. 8 is a diagram showing an example dubbing condition menu screen displayed on the monitor of the DVD recorder equipped with a hard disk in FIG. 1.

When the cursor 55 is moved to the "dubbing save programming setup" button 53 after the recording condition has been designated on the unattended recording setup screen 51 shown in FIG. 6, and when the button 53 is selected by the selection and execution operation of the remote controller 13, a dubbing condition template list screen 57 shown in FIG. 8 is displayed.

A list 58 of dubbing condition templates that are registered is shown on the dubbing condition template list screen 57. In this embodiment, five templates are registered.

Based on these dubbing conditions of the templates, a dubbing condition for dubbing a recorded program can be determined in the following manner. In the case of dubbing a drama, for example, when an image quality higher than the dubbing condition of the template is desired, the number of programs to be dubbed to a single DVD need only be reduced compared with the number of programs defined in the dubbing condition of the template. When an image quality lower than the quality defined in the dubbing condition of the template is desired, the number of programs to be dubbed to a single DVD can be increased compared with the number of programs defined in the dubbing condition of the template. For a one-hour drama or a two-hour drama, the number of programs to be dubbed to a single DVD can be determined based on the dubbing condition of the template.

While referring to FIG. 6, a drama is the genre of a program for unattended recording, for which the recording condition is designated on the unattended recording setup screen 51. Therefore, a cursor 59 in a box shape is moved on the list 58 in FIG. 8, and the standard dubbing condition of the template, which is registered under the name of "for drama", is selected by the selection and execution operation of the remote controller 13. Then, the dubbing condition template list screen 57 is shifted to an unattended dubbing setup screen 60 in FIG. 9.

The unattended dubbing setup screen 60 is used to designate a condition in which the dubbing unit 8 dubs, to a DVD, a program recorded on the HDD 7, i.e., a dubbing condition. Boxes for designating the dubbing conditions, i.e., a "dubbing destination" box 61a, a "CM skip" box 61b, a "save a program after watching" box 61c, a "the number of programs to be dubbed to a single recording medium" box 61d, a "record with the same image quality as for saving" box 61e, a "create a DVD menu" box 61f and "register as a template" box 61g are provided on the unattended dubbing setup screen 60.

The "dubbing destination" box 61a is sued to designate a removable recording medium to which broadcasting programs recorded on the HDD 7 (hereinafter referred to as recorded programs) are to be dubbed. As a default, a DVD is designated in consonance with the setup on the dubbing condition template list screen 57 in FIG. 8. A cursor 65 in a box shape is moved to the "dubbing destination" box 61a by manipulating the arrow keys 16 of the remote controller 13, and the enter key 17 is manipulated (the selection and designation is performed by the remote controller 13), the type of recording medium is changed each time of the manipulation, so that a desired recording medium can be selected. In this embodiment, as is described above, a DVD is selected. Thus, according to the condition entered in FIG. 9, a program (in this case "Drama: Kyoto Story" on channel BS222) for which unattended recording is designated and also the recording condition is set on the unattended recording setup screen 51 in FIG. 6 is to be dubbed to a DVD after having been recorded.

The "CM skip" box 61b is used to designate whether or not CMs should be skipped when a recorded program is to be dubbed. "Yes" or "No" can be selected by the selection and execution operation of the remote controller 13.

The "save a program after watching" box 61c is used to designate whether or not a recorded program should be dubbed after being watched one time. "ON" or "OFF" can be selected by the selection and designation operation of the remote controller 13. When "ON" is selected, a recorded program is not dubbed unless it is once watched. Since "OFF" is selected in FIG. 9, the program for which unattended recording is set can be dubbed to a DVD when this program has been recorded and a DVD is loaded into the dubbing unit 8.

The "number of programs to be dubbed to a single recording medium" box 61d is used for a program back to designate the number of recorded programs to be dubbed to a single DVD that is selected at the "dubbing destination" box 61a. The number of programs (three in this case) consonant with the dubbing condition of the template that is selected on the list 58 in FIG. 8 is set as a default. Further, the image quality, such as "standard quality", is displayed for dubbing. This image quality is determined based on the time slot of a program for which the dubbing condition is defined (in this case, "Drama; Kyoto Story" for which the recording condition is designated on the unattended recording setup screen 51 in FIG. 6), the number of programs to be dubbed to a single DVD and the capacity of a DVD. When the program is a one-hour program as in the dubbing condition of the template in FIG. 8, "low image quality" is set. When the program is longer or shorter, the image quality is changed.

The number of programs to be dubbed to a single DVD, which is indicated at the "number of programs to be dubbed to a single recording medium" box 61d, can also be designated by the selection and execution operation of the remote controller 13. However, depending on the number of programs to be dubbed to a single DVD, the dubbing may not be performed with the image quality designated at the "recording mode" box 51d on the unattended recording setup screen 51 in FIG. 6. In this case, before dubbing, the image processor 10 of the recorder 1 with a dubbing function reduces the data volume of the recorded program, and accordingly, the image quality is degraded. As a result, the dubbing image quality at the "number of programs to be dubbed to a single recording medium" differs from the image quality defined in the dubbing condition of the template shown in FIG. 8.

The "record with the same image quality as for saving" box 61e is used to designate the recording image quality of a broadcasting program (in this case, "Drama; Kyoto Story" on channel BS222) that is to be dubbed. "Yes" or "No" can be selected by the selection and execution operation of the remote controller 13. When "Yes" is selected, the image quality (low in this case) consonant with the number of programs to be dubbed that is indicated at the "number of programs to be dubbed to a single recording medium" box 61d is designated as a recording image quality. Therefore, even when "high image quality" has been set as a default at the "recording mode" box 51d on the unattended recording setup screen 51, the image quality (low in this case) selected at the "number of programs to be dubbed to a single recording medium" box 61d on the unattended dubbing setup screen 60 is linked with the "recording mode" box 51d on the unattended recording setup screen 51, so that the low image quality is set at the "recording mode" box 51d on the unattended recording setup screen 51. When "No" is selected at the "record with the same image quality as for saving" box 61e, "high image quality" is maintained as a default at the "recording mode" 51d on the unattended recording setup screen 51.

The "create a DVD menu" box 61f is used to designate whether or not a menu of programs dubbed to a DVD should be created. "Yes" or "No" can be selected by the selection and execution operation of the remote controller 13. When "Yes" is selected, a menu (DVD menu) of dubbed programs is created and recorded on the DVD. As is shown in FIG. 10A, a DVD menu setup screen 66 is displayed on which various designs 67a to 67f of a DVD menu are shown. One of the designs can be selected by the selection and execution operation of the remote controller 13. When a DVD menu design is selected, or when a "cancel" button 66a is selected by the selection and execution operation of the remote controller 13 indicating no design is selected, the display is returned to the unattended dubbing setup screen 60 in FIG. 9.

The "register as a template" box 61g is used to register, as a template, the dubbing condition that is designated on the unattended dubbing setup screen 60. "Yes" or "No" can be selected by the selection and execution operation of the remote controller 13. When "Yes" is selected, a template registration screen 68 shown in FIG. 10B is displayed. When the name of a template to be registered is entered on the template registration screen 68, and a "register" button 69a is selected by the selection and execution operation of the remote controller 13, the pertinent dubbing condition is recorded and registered as a new template in the information recording unit 6, and the display is returned to the unattended dubbing setup screen 60 in FIG. 9. When a "cancel" button 69b is selected, the display is returned to the unattended dubbing setup screen 60 in FIG. 9, without a new template being registered. The thus registered new template for the dubbing condition is added and displayed on the dubbing condition template list screen (FIG. 8) at the next time.

After the dubbing condition has been designated on the unattended dubbing setup screen 60, and when a "setup save" button 62 is selected by the selection and execution operation of the remote controller 13, the recording condition and the dubbing condition of a broadcasting scheduled program, for which the unattended recording is designated on the unattended recording setup screen 51 in FIG. 6, are linked together and stored in the information storage unit 6 of the recorder 1. At this time, since the unattended recording setup complete screen 56 in FIG. 7 is also displayed, the "OK" button 56a is selected by the selection and execution operation of the remote controller 13, and then, the display is returned to the program guide screen 40 in FIG. 4.

Figure 9:
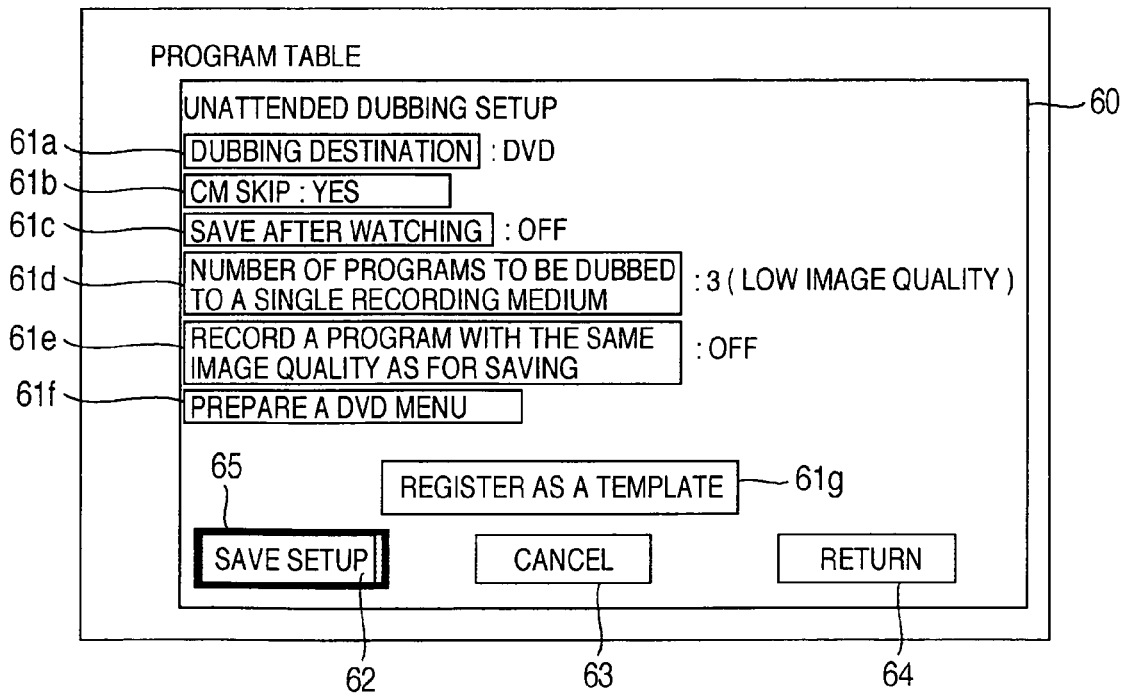
FIG. 9 is a diagram showing an example unattended dubbing setup screen displayed on the monitor of the DVD recorder equipped with a hard disk in FIG. 1.
Figure 10A:
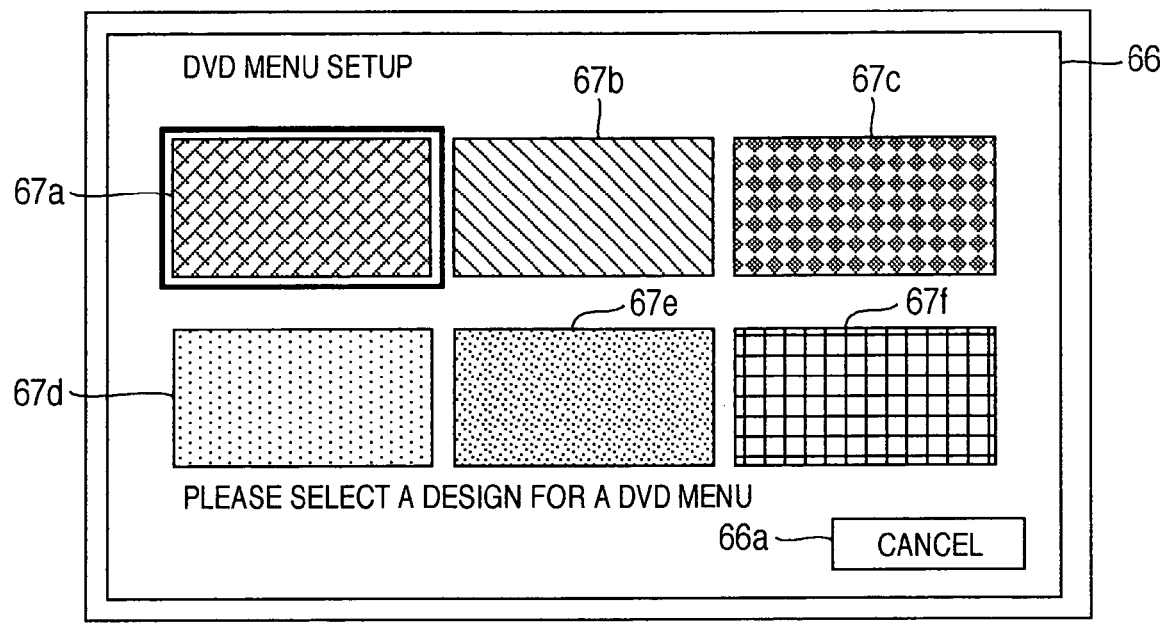
FIGS. 10A and 10B are diagrams showing an example DVD menu setup screen and an example template registration screen displayed on the monitor of the DVD recorder equipped with a hard disk in FIG. 1.
Figure 10B:
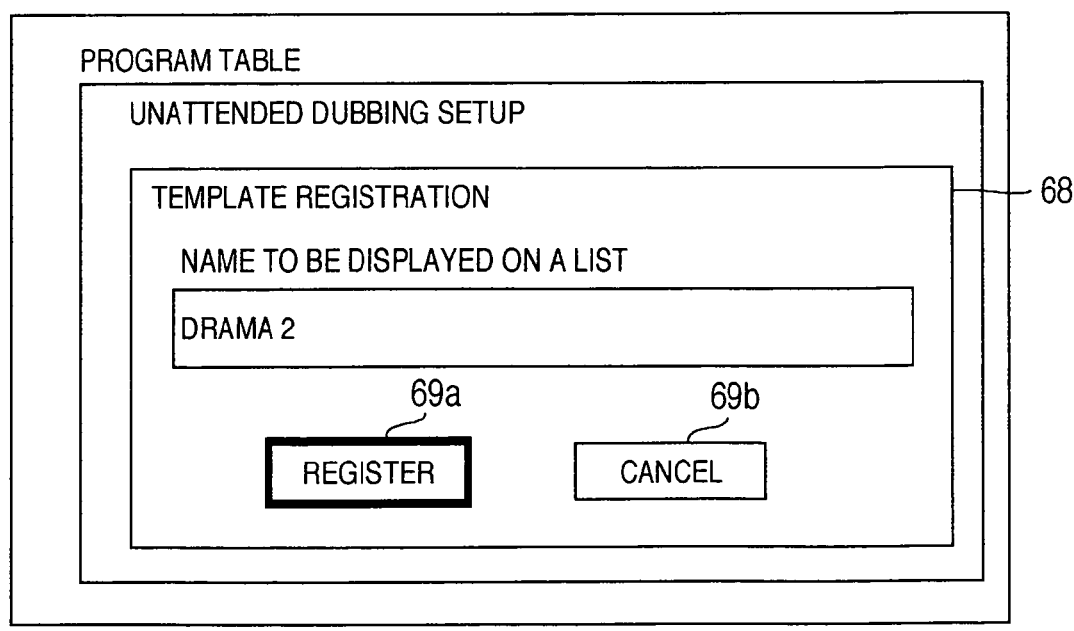

When a "cancel" button 63 on the unattended dubbing setup screen 60 in FIG. 9 is selected by the selection and execution operation of the remote controller 13, the recording condition set on the unattended recording setup screen 51 in FIG. 6 and the dubbing condition set on the unattended dubbing setup screen 60 are all canceled, and the display is returned to the program guide screen 40 in FIG. 4. When a "return" button 64 on the unattended dubbing setup screen 60 in FIG. 9 is selected by the selection and execution operation of the remote controller 13, the display is returned to the dubbing condition template list screen 57 in FIG. 8, while the dubbing condition designated on this screen 60 is maintained. Thus, the template for another dubbing condition can be selected.

The recording condition and the dubbing condition for a program for which the unattended recording is designated are stored and saved in the information storage unit 6 in FIG. 6, with being correlated with together, or with the dubbing condition being included in the recording condition. When the menu button 15 (FIG. 2) of the remote controller 13 is manipulated to display a menu screen 85 in FIGS. 13A and 13B that will be described later, and a "programming list" box 86d is selected, the list of recording conditions and dubbing conditions that are set up in the above described manner, can be displayed. When a desired program is selected, the unattended recording setup screen 51 in FIG. 6 and the unattended dubbing setup screen 60 in FIG. 9 can be displayed, and on these screens, the recording condition or the dubbing condition can be altered.

The controller 4 constantly monitors the recording condition and the dubbing condition recorded in the information storage unit 6. When the unattended recording date of one of programs designated as unattended recording is reached, the controller 4 activates the tuner 2, the image data preparation unit 3 and the HDD 7 to receive the pertinent program and record it on the HDD 7. Furthermore, after this broadcasting program is recorded, recorded program information is created and stored in the information storage unit 6.

FIG. 11 is a diagram showing example recorded program information 69 that is information related to programs that were recorded under the recording condition, or both the recording condition and the dubbing condition, that were designated in the above described manner. The recorded program information 69 is stored in the information storage unit 6 of the recorder 1 with a dubbing function.

The recorded program information 69 includes video data 70a, a programming ID (identification symbol) 70b, a program title 70c, a numbering form 70d, an image quality 70e, a recording date 70f and other program information 70g, and the video data 70a is the thumbnail image of a recorded program.

The programming ID 70d is an ID assigned to each program for which the unattended recording is designated, and the same programming ID 70b is allocated to each program in the same program pack, such as a serial drama, for which the recording condition is collectively designated for a plurality of programs on the "day and time" box 51c on the unattended recording setup screen 51 in FIG. 6. For example, according to the recorded program information 69, program A is broadcast on CH (channel) 1 at a specified time slot at a specified day of a week. When these contents are set on the "day and time" box 51c on the unattended recording setup screen 51, this recording condition is applied for the programs to be broadcast that are regarded as being included in the same program pack. Therefore, the same programming ID is allocated for all programs A. The same process is performed for program B.

Whereas, the recording condition is designated individually for programs C to F, and different programming IDs are allocated to these programs.

The programs in the program pack to which the same programming ID 70b is allocated are dubbed to a DVD by the number as designated at the "number of programs to be dubbed to a single recording medium" box 61d on the unattended dubbing setup screen 60 in FIG. 9.

The allocation of the programming ID to the recorded program is performed based on the recording condition designated at the unattended recording setup screen 51 in FIG. 6. As for a plurality of programs, for which the same contents are set at the "program title" box 51a and the "channel" box 51b on the unattended recording setup screen 51 and for which the same day in every week and the same time slot are designated at the "day and time" box 51c, i.e., which are broadcast at every predetermined interval like a serial drama, the same programming ID is assigned as programs in the same program pack.

In the example shown in FIG. 11, program A is to be broadcast with the same program title, on the same channel and at the same time slot on the same day of a week. When the recording condition is designated for the program A, the same programming ID is allocated for all the programs A. Then, it is programmed that the programs A are to be dubbed to DVDs in order by the number designated at the "number of programs to be dubbed to a single recording medium" box 61d on the unattended dubbing setup screen 60. In this case, an ID corresponding to the programming ID 1 assigned to the programs A is allocated to the DVDs.

The program title 70c of the recorded program information 69 is a program title designated at the "program title" box 51a on the unattended recording setup screen 51 in FIG. 6. The numbering form 70d is consonant with the contents designated at the "next number" box 51f and the "numbering form" box 51g when "Yes" is selected at the "add a serial number to a title" box 51e for a program pack. For example, as for the recorded programs of the program pack for which the program title 70c is "program A", since the "next number" box 51f that is the recording condition is changed each time the program A was recorded, "first episode", "second episode", "third episode", "fourth episode" and "fifth episode" are provided in the recording order.

The fifth episode to the ninth episode of the program B form a single program pack, and the same "programming ID2" is allocated as the programming ID 70c. The programs B are to be dubbed to a single DVD by the number designated at the "number of programs to be dubbed to a single recording medium" 61d on the unattended dubbing setup screen 60 in FIG. 9. For example, when the designated number is "3" as is shown in FIG. 9, every three episodes of the program B beginning from the fifth episode are dubbed to a single recording medium (a DVD in this case). The ID corresponding to the programming ID of the program B is allocated to the individual DVDs.

Programs C, D, E and F are individual programs for which different recording conditions and different dubbing conditions are designated, and accordingly, different programming IDs are allocated.

The image quality 70e of the recorded program information 69 is a bit rate "bps (byte/second)" that represents the image quality designated at the "recording mode" box 51d on the unattended recording setup screen 51 in FIG. 6, or the image quality established at the "number of programs to be dubbed to a single recording medium" box 61d on the unattended dubbing setup screen 60 in FIG. 9 when "Yes" is selected at the "record with the same image quality as for saving" box 61e. The range of the bit rate is determined for the highest image quality, a high image quality, the standard image quality, a low image quality and the image quality for long recording. The bit rate used for recording is employed for the image quality 70e of the recorded program information 69. In accordance with this bit rate, the highest image quality, a high image quality, the standard image quality, a low image quality or the image quality for long recording is displayed at the "recording mode" box 51d on the unattended recording setup screen 51 and at the "number of programs to be dubbed to a single recording medium" box 61d on the unattended dubbing setup screen 60.

The recording date 70f of the recorded program information 69 represents the recording day and time of the program, and may include the channel for the recorded program. The other program information 70g is relevant information other than the image data type 70a of the recorded program, the programming ID (identification symbol) 70b, the program title 70c, the numbering form 70d, the image quality 70e and the recording date 70f. Example other program information 70g is the program contents information 47 (FIG. 5) stored in the information storage unit 6 of the recorder 1, the designated dubbing condition and information indicating whether or not watching of the program is desired when "Yes" has been selected at the "save after watching" box 61c on the unattended dubbing setup screen 60 in FIG. 9 (dubbing condition).

As is described above, when broadcasting programs for which the recording condition and the dubbing condition have been designated are recorded to the HDD 7 (FIG. 1) of the recorder 1, the recorded program information 69 (FIG. 11) is prepared and stored in the information storage unit 6. For recorded programs for which the dubbing is available, dubbing setup information is prepared and stored in the information storage unit 6 (FIG. 1). For a program for which recording is required only one time as specified at the "day and time" box 51c on the unattended recording setup screen 51 in FIG. 6, dubbing setup information is prepared after the recording is completed, and the dubbing can be performed. For a program pack for which specified day and time, such as every week or from Monday to Friday, i.e., a plurality of recording times are designated at the "day and time" box 51c and for which 2 or greater number is designated at the "number of programs to be dubbed to a single recording medium" box 61d on the unattended dubbing setup screen 60 in FIG. 9, the dubbing setup information is prepared after the number of programs as designated at the "number of programs to be dubbed to a single recording medium" box 61d have been recorded, and then, the dubbing operation can be performed. For example, for program pack "Drama; Kyoto Story" for which the dubbing condition is designated on the unattended dubbing setup screen 60 in FIG. 9, when the first to the sixth episodes have been recorded under the recording condition shown in FIG. 6, the dubbing setup information is prepared for the first to the third episodes and for the fourth and the sixth episodes. When recording of the seventh episode is completed, however, new dubbing setup information is not created, and the preparation thereof is waited until the ninth episode is recorded. It should be noted that the dubbing setup information includes an ID for permitting dubbing, a program title and a number, such as an episode number. With the dubbing setup information, programs identified with the numbers included in this information are permitted to be dubbed to a single DVD. In case wherein all the recorded programs are those for which dubbing is not permitted, one set of dubbing setup information that includes a dubbing inhibit ID is always prepared. As unattended recording is performed and there is a recorded program that can be dubbed, the dubbing setup information may be applied for this program, and the ID may be changed to a dubbing permission ID.

When the unattended recording is performed and the recorded program information 69 is prepared, and when the user manipulates the recorded program button 20 of the remote controller 13, or when the user manipulates the menu button 15 to display the menu screen 85 in FIG. 13 that will be described later, and selects a "recorded program" box 86*b*, a recorded program list screen 108 in FIG. 18 that will be described later is displayed. When a desired recorded program is selected by moving a cursor 111 and the play button 27 (FIG. 2) of the remote controller 13 is manipulated, the recorded program is played and presented on the monitor screen.

For a recorded program for which "ON" has been selected at the "save after watching" box 61*c* on the unattended dubbing setup screen 60 in FIG. 9, the dubbing condition is automatically changed when the program is played by using the remote controller 13 until the end, so that "OFF" is automatically selected at the "save after watching" box 61*c*, and the dubbing of the program is enabled.

Figure 12:
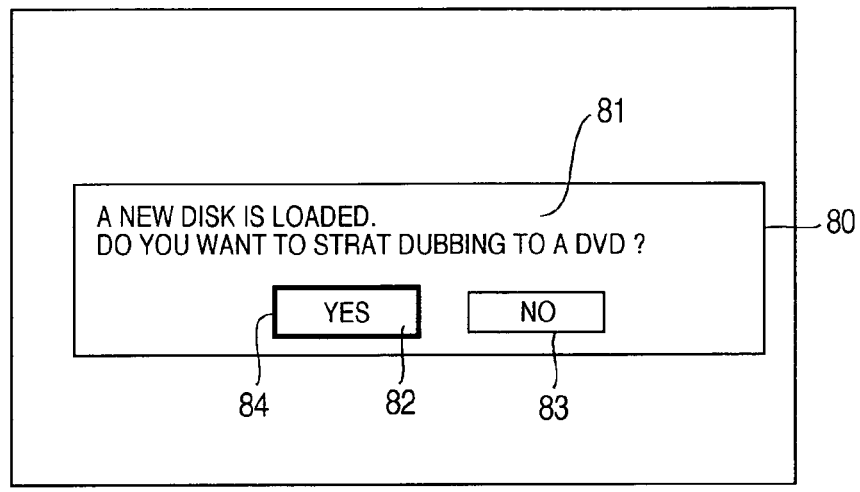
FIG. 12 is a diagram showing an example disk setting complete screen displayed on the monitor of the DVD recorder equipped with a hard disk shown in FIG. 1.

When the recorded program for which dubbing is enabled based on the dubbing condition i.e., for which the dubbing setup information is designated, is stored on the HDD 7 while the recorded program information 69 is stored in the information storage unit 6, and when a DVD having a free recording capacity is loaded into the dubbing unit 8 of the recorder 1, the received program screen 30 in FIG. 3, for example, is changed to a disk setting complete screen 80 shown in FIG. 12 to notify a user that a disk has been set.

A message 81 is displayed on the disk setting complete screen 80 to notify the setting of a DVD and to inquire whether dubbing to a DVD is to be executed. A "Yes" button 82 and a "No" button 83 are also displayed, and either button can be selected by moving a cursor 84 in a box shape through the selection and execution operation of the remote controller 13. When the "Yes" button 82 is selected, the display is returned to the received program screen 30 in FIG. 3. When the "No" button 83 is selected, a screen for setting dubbing (dubbing setup screen) that will be described later is displayed on the monitor.

Figure 13A:
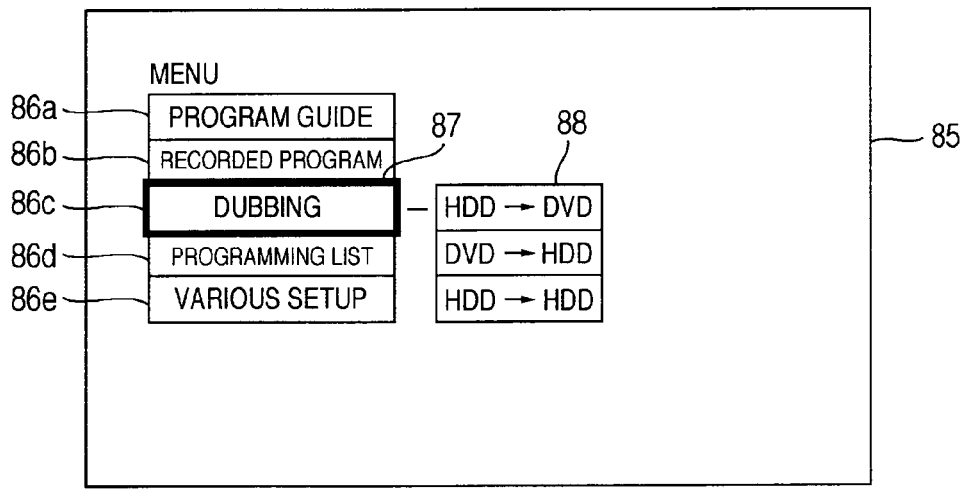
FIGS. 13A and 13B are diagrams showing an example function menu screen displayed on the monitor of the DVD recorder equipped with a hard disk shown in FIG. 1.

Further, when the menu key 15 (FIG. 2) of the remote controller 13 is manipulated, the menu screen 85 shown in FIG. 13A is displayed on the monitor, regardless of whether or not a DVD has been set to the dubbing unit 8 of the recorder 1.

A "program guide" 86*a*, a "recorded program" 86*b*, a "dubbing" 86*c*, a "programming list" 86*d* and a "various setups" 86*e* are provided as items on the menu screen 85, and one of the items can be selected by moving a cursor 87 in a box shape through the selection and execution operation of the remote controller 13.

Figure 13B:
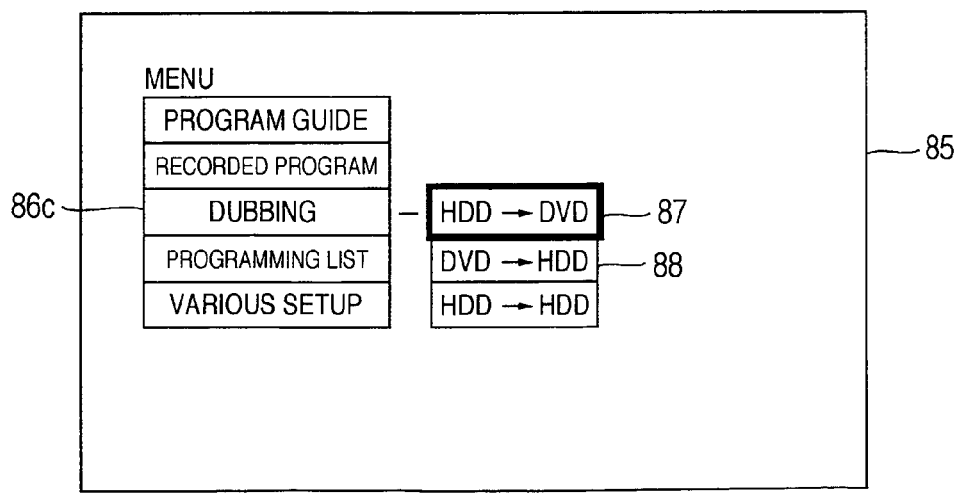

When the cursor 87 is moved to the "dubbing" 86*c*, and when dubbing is enabled, sub-items 88 are displayed to select a dubbing direction. The sub-items 88 are, for example, dubbing from a HDD to a DVD, "HDD→DVD", dubbing from a DVD to an HDD, "DVD→HDD", and dubbing from an HDD to an HDD, "HDD→HDD". As is shown in FIG. 13B, when the cursor 87 is moved to "HDD→DVD" on the sub-item 88 and the selection and execution operation of the remote controller 13 is performed, a dubbing setup screen that will be described later is displayed on the monitor, as well as when the "Yes" button 82 is selected on the disk setting complete screen 80 in FIG. 12.

The dubbing process includes both a process for copying data for, for example, a recorded program and a process for moving data to another recording medium (in this case, data at a dubbing source are erased). When the recorded program is, for example, a movie, copying may be prohibited, and in this case, only moving of data is available.

Figure 14:
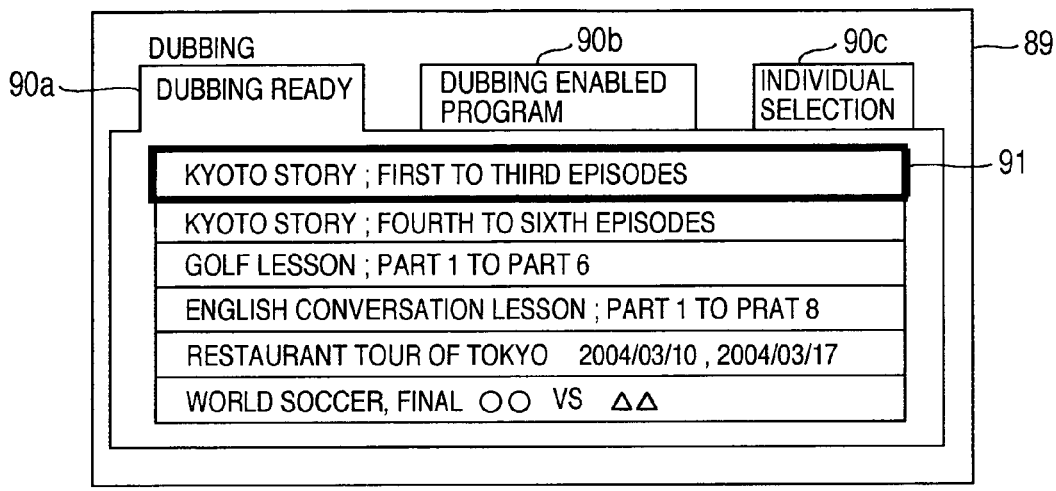
FIG. 14 is a diagram showing an example dubbing setup screen displayed on the monitor of the DVD recorder equipped with a hard disk shown in FIG. 1.

FIG. 14 is a diagram showing an example dubbing setup screen 89. When the "Yes" button 82 is selected on the disk setting complete screen 80 in FIG. 12 by the selection and execution of the remote controller 13, or when the sub-item 88 on the menu screen 85 in FIG. 13B is selected by the selection and execution operation of the remote controller 13, the dubbing setup screen 89 is displayed on the monitor.

A "dubbing ready" tag 90*a*, a "dubbing enabled program" tag 90*b* and an "individual selection" tag 90*c* are provided on the dubbing setup screen 89. When the "dubbing ready" tag 90*a* is selected, the above described dubbing condition is designated, and the list of recorded programs that can be dubbed is displayed. By the selection and execution operation of the remote controller 13, a cursor 91 in a box shape is moved on the list, and a recorded program that is desired to be dubbed can be selected. On the list, the recorded programs are presented based on the recording condition and the dubbing condition that are designated. For example, recorded program "Kyoto Story", the numbering form is designated on the unattended recording setup screen 51 in FIG. 6, and the first to the sixth episodes were recorded. Further, since "3" is designated on the unattended dubbing setup screen 60 in FIG. 9 as the number of programs to be dubbed to a single DVD, program "Kyoto Story" is divided into the first to third episodes and the fourth to sixth episodes.

Figure 15:
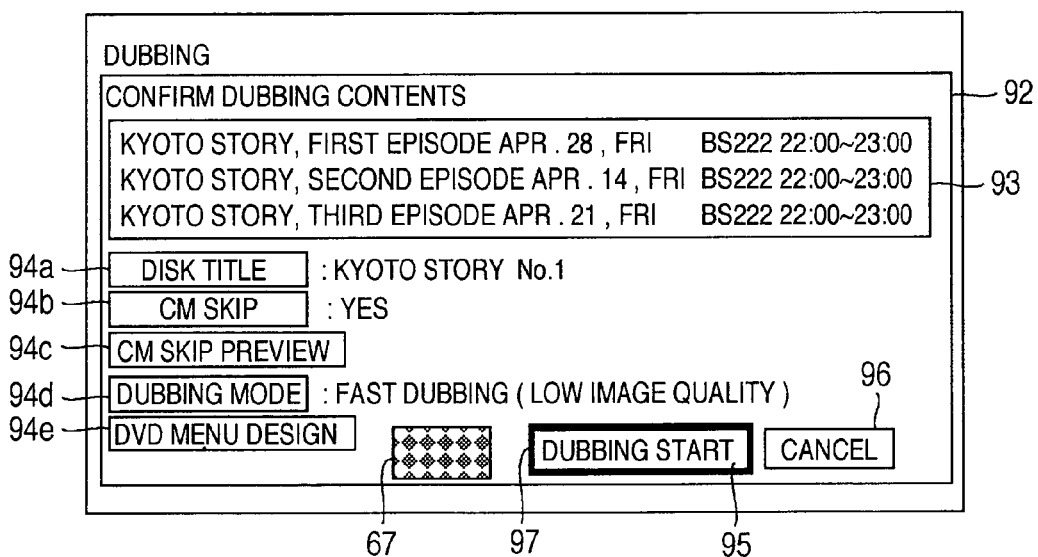
FIG. 15 is a diagram showing an example dubbed contents confirmation screen displayed on the monitor of the DVD recorder equipped with a hard disk shown in FIG. 1.

When "Kyoto Story, first to third episodes" is selected on the recorded program list at the "dubbing ready" tag 90*a* by the selection and execution operation of the remote controller 13, a dubbing contents confirmation screen 92 in FIG. 15 is displayed for the recorded program that is selected for dubbing. On the dubbing contents confirmation screen 92, detailed information 93, such as a broadcast date, is displayed for the recorded program that is selected on the recorded program list on the dubbing setup screen 89 in FIG. 14. In this embodiment, recorded information "Kyoto Story, first to third episodes" is selected, and the broadcast date is displayed for each episode.

The dubbing contents confirmation screen 92 also includes: a "disk title" box 94*a*, which indicates a title to be provided for a recording medium used for dubbing (a DVD in this case); a "CM skip" box 94*b*, which is used to designate whether CM skip is required; a "CM skip preview" box 94*c*, which is used to confirm the CM skip state in the recording when "Yes" is designated at the "CM skip" box 61*b* on the unattended dubbing setup screen 60 in FIG. 9; a "dubbing mode" box 94*d*, which is used to designate a dubbing speed; and a "DVD menu design" box 94*e*, which represents the design of a DVD menu selected on the DVD menu setup screen 66 in FIG. 10A. The title of a recorded program is designated at the "disk title" box 94*a*, and when "Yes" is set at the "CM skip" box 61*b* on the unattended dubbing setup screen 60 in FIG. 9, "Yes" is also designated at the "CM skip" box 94*b*. A "fast dubbing" is set at the "dubbing mode" box 94*d*, and the image quality for dubbing is also displayed. A "dubbing start" button 95 and a "cancel" button 96 are also provided on the dubbing contents confirmation screen 92, and can be selected by using a cursor 97 in a box shape through the selection and execution operation of the remote controller 13. When the "cancel" button 96 is selected, the display is returned to the received program screen 30 shown in FIG. 3.

When "No" is selected at the "CM skip" box 61b on the unattended dubbing setup screen 60 in FIG. 9, "No" is also set at the "CM skip" box 94b of the dubbing contents confirmation screen 92. When the "dubbing start" button 95 is selected in this state, the dubbing unit 8 (FIG. 1) of the recorder 1 immediately starts dubbing. In this case, naturally, a DVD is already set in the dubbing unit 8. When a DVD is not set, this effect is displayed on the dubbing contents confirmation screen 92. The dubbing operation is performed in the following manner. Data for a program ("Kyoto Story, first to third episodes" in this case), for which the detailed information 93 is displayed on the dubbing contents confirmation screen 92, are read from the HDD 7 (FIG. 1) of the recorder 1, and are transmitted to the image processor 10 (FIG. 1). The image processor 10 performs image processing for the data, so that the image quality is consonant with the contents designated at the "number of programs to be dubbed to a single recording medium" box 61d on the unattended dubbing setup screen 60 in FIG. 9. Thereafter, the data are transmitted to the dubbing unit 8 (FIG. 1), and are dubbed to a DVD.

Figure 16:
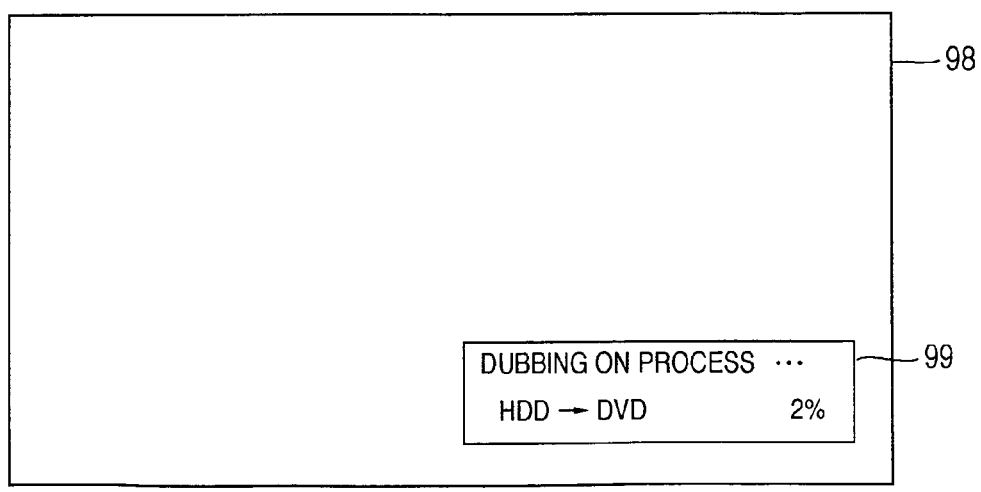
FIG. 16 is a diagram showing an example dubbing development screen displayed on the monitor of the DVD recorder equipped with a hard disk shown in FIG. 1.

Furthermore, a dubbing development screen 98 in FIG. 16 is displayed during the dubbing operation, and dubbing development information 99, such as the dubbing direction like "HDD→DVD", and the dubbing development like "2%", is displayed together with a message, such as "dubbing on process" or "dubbing completed". When the dubbing operation is completed and a predetermined operation is performed, the display is shifted to the received program screen 30 in FIG. 3.

When "Yes" is designated at the "CM skip" box 94b on the dubbing contents confirmation screen 92 and the "skip preview" button 94c is selected, a CM skip preview screen 100 in FIG. 17A is displayed on the monitor. Programs 101a, 101b and 101c for which the detailed information 93 is displayed on the dubbing contents confirmation screen 92 are displayed on the CM skip preview screen 100, and one of the programs for which the preview of CM skip is desired is selected by a cursor 107 in a box shape. The data for the selected program (the program 101a in this embodiment) are reproduced from the HDD 7 (FIG. 1) of the recorder 1, and are displayed in a playback display area 102, and further, a play bar 103 is displayed that represents the total play period of the selected program. The left edge of the play bar 103 is a play start edge, and the right edge is a play end edge, and as the program is being played, a play mark 105 is shifted toward right from the left edge of the play bar 103. That is, the location of the play mark 105 on the play bar 103 corresponds to the playback location of the program.

When the "skip preview" button 94c is selected on the dubbing contents confirmation screen 92 in FIG. 15, and the CM skip preview screen 100 in FIG. 17A is displayed, the program is started to be played in the normal play mode. However, so long as the CM skip preview screen 100 is displayed, the fast forward button 28 or the reverse button 29 of the remote controller 13 can be employed to set the fast forward play mode, or the reverse play mode. Further, the play mode can be returned to the normal play mode by manipulating the playback button 27.

When "Yes" is selected at the "CM skip" box 61b on the unattended dubbing setup screen 60 in FIG. 9, an area of the play bar 103 that corresponds to the CM is defined as a chapter. In this embodiment, individual hatched areas between chapters 104a and 104b, chapters 104c and 104d, and chapter 104e and the final edge are defined as CM skip areas. Since "Yes" is designated at the "CM skip" box 61b on the unattended dubbing setup screen 60 in FIG. 9, these CM skip areas are automatically set in the recording operation.

The CM skip areas can be corrected by using the color (blue) button 22 and the color (red) button 23 (FIG. 2) of the remote controller 13. For example, when the picture of the program 101a is examined in the playback display area 102 and the chapter 104a is shifted from the CM start time, the play mark 105 is stopped at the location of the chapter 104a by manipulating the stop button 26 (FIG. 2) of the remote controller 13, and in this state, the color (red) button 23 is manipulated. As a result, the chapter 104a is deleted, and the play bar 103 in FIG. 17B is obtained on the CM skip preview screen 100.

Thereafter, the CM start location is searched for by manipulating the buttons 26 to 29 of the remote controller 13 (during this operation, the play mark 105 is shifted along the play bar 103). Then, the play mark 105 is adjusted at the start location on the play bar 103, and the color (blue) button 22 of the remote controller 13 is manipulated. As a result, as is shown in FIG. 17C, a chapter 104a' is entered to the play bar 103. Following this, by using the reverse button 29 of the remote controller 13, the play mark 105 is moved slightly before the new chapter 104a' as is shown in FIG. 17D, and the playback operation is restarted by using the play button 27 of the remote controller 13. In this manner, it can be identified whether the new chapter 104a' correctly represents the start of the CM skip area. After this confirmation, the chapter 104a' (start location of the CM skip area) is designated by using the color (yellow) button 25 of the remote controller 13. When this setup operation is not performed, the correction of the chapter is canceled, and the old chapter 104a is still active.

In the same manner, the location of another chapter can be corrected as needed. When the correction of the CM skip area of the program 101a is completed, the cursor 107 is moved to the next program 101b, so that the correction of the CM skip area for the program 101b can be performed. The same process is performed for the next program 101c.

When the correction of the CM skip areas for the individual programs 101a to 101c is completed, the cursor 107 is shifted to a "confirmation complete" button 106. The thus corrected CM skip areas are established by manipulating the enter button 17 (FIG. 2) of the remote controller 13, and the dubbing of the programs 101a to 101c to a DVD is initiated. At the same time, the dubbing development screen 98 in FIG. 16 is displayed on the monitor.

In order to confirm only whether the CM skip areas are designated for the programs 101a to 101c, as is shown in FIG. 17a, the cursor 107 need only be moved sequentially on the CM skip preview screen 100 that is displayed. Since the play bar 103 is displayed for the individual programs 101a to 101c, the CM skip area for each program can be confirmed. The cursor 107 located at the program 101c is thereafter shifted to the "confirmation complete" button 106, and the dubbing operation can be initiated.

The dubbing operation can be performed when, as is described above, a DVD is loaded into the dubbing unit 8 (FIG. 1) of the recorder 1 and the "Yes" button 82 is selected on the disk setting complete screen 80 in FIG. 12 displayed on the monitor, or when "dubbing" is selected on the menu screen 85 in FIG. 13 that is displayed on the monitor by manipulating the "function menu" button 18 (FIG. 2) of the remote controller 13. The dubbing operation can also be performed by manipulating the "recorded program" button 20 (FIG. 2) of the remote controller 13.

Figure 18:
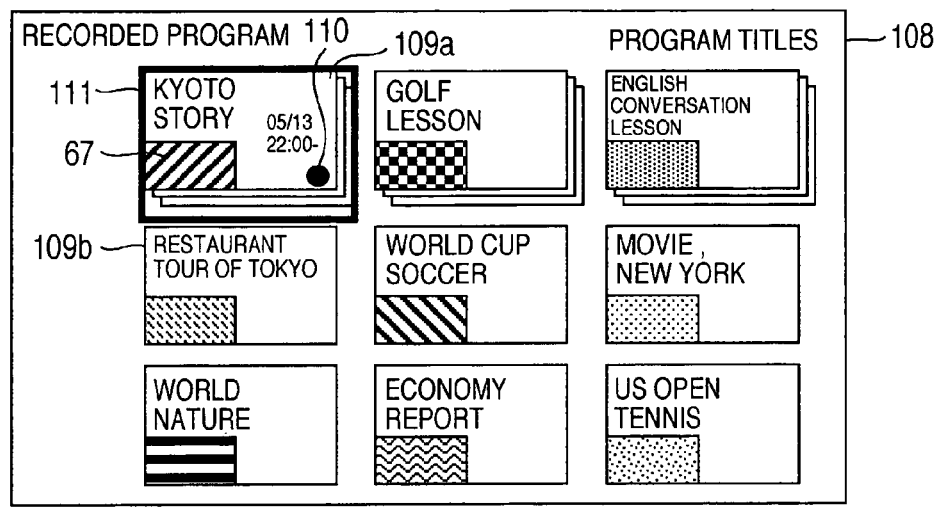
FIG. 18 is a diagram showing an example recorded program list screen displayed on the monitor of the DVD recorder equipped with a hard disk shown in FIG. 1.

When the "recorded program" button 20 is manipulated, a recorded program list screen 108 in FIG. 18 is displayed on the monitor. On the recorded program list screen 108, recorded programs are displayed in accordance with the program titles. And a program pack, such as a serial drama, that is broadcast on the same channel, with the same title, at the same time slot and at every predetermined interval, i.e., a series of programs that have the same programming ID, are collectively displayed. Program "Kyoto Story" 109*a* corresponds to this program pack. Programs for which unattended recording is individually designated are displayed independently. Program "Restaurant tour of Tokyo" 109*b* corresponds to this type of program.

As is described above, a series of programs in a program pack are displayed with being superimposed, and even when the programs are superimposed and displayed, the pertinent program pack can be easily identified. Therefore, the number of recorded programs displayed on one screen is reduced, and the list of recorded programs can be easily seen.

The DVD menu design 67 selected on the DVD menu setup screen 66 in FIG. 10 is displayed for each program, and a dubbing ready complete mark 110 is provided for a program for which dubbing is enabled, i.e., a program for which the dubbing setup information is designated. The "dubbing ready complete" is the state wherein the dubbing condition designated on the unattended dubbing setup screen 60 in FIG. 9 is established, and the dubbing can be performed. In this case, only the "Kyoto Story" 109*a* is in the dubbing ready complete state. In addition, since the dubbing is enabled also for the independent recorded programs for which the dubbing condition is designated on the unattended dubbing setup screen 60 in FIG. 9, the dubbing ready complete mark 110 is provided for these programs.

Figure 19A:
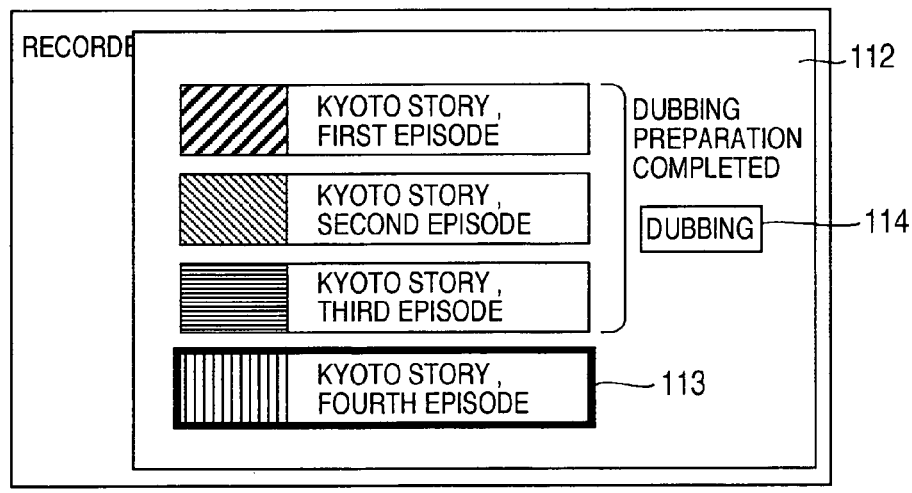
FIGS. 19A and 19B are diagrams showing an example selected recorded program screen displayed on the monitor of the DVD recorder equipped with a hard disk shown in FIG. 1.

By the selection and execution operation of the remote controller 13, a desired program can be selected by using a cursor 111 in a box shape. When the program "Kyoto Story" 19*a* for which the dubbing read complete mark 110 is provided is selected, a selected recorded program screen 112 in FIG. 19A is displayed on the monitor, and the selected program "Kyoto Story" 109*a* is displayed for each broadcast date (for each episode) on the selected recorded program screen 112. When dubbing is available, a message of this effect is displayed. Assume that the recording condition for the program "Kyoto Story" 109*a* is designated on the unattended recording setup screen 51 in FIG. 6, and the unattended dubbing is set on the unattended dubbing setup screen 60 in FIG. 9. When the first to fourth episodes were recorded, the first to third episodes can be dubbed, so that dubbing ready complete message is displayed for the first to third episodes. The dubbing of the fourth episode is enabled after the fifth and the sixth episodes are recorded.

Figure 19B:
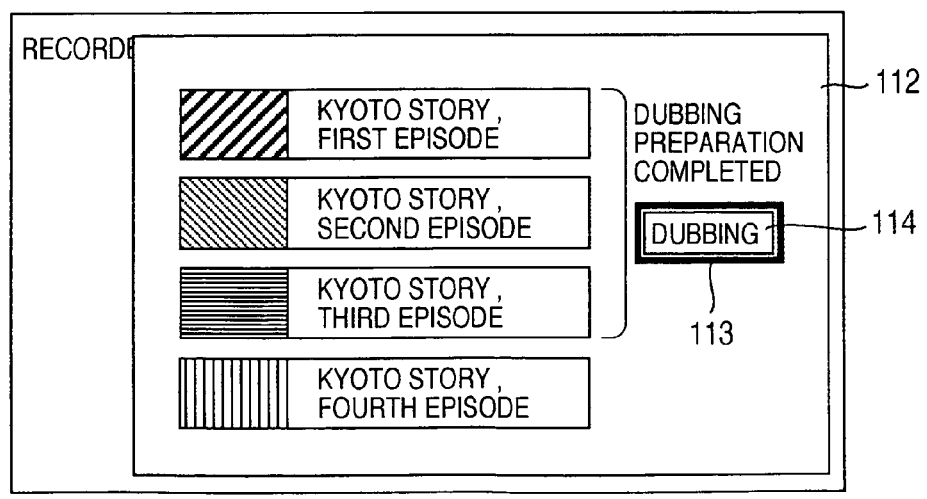

On the selected recorded program screen 112, a cursor 113 in a box shape is positioned as a default for the fourth episode that is recorded at the latest. However, the cursor 113 can be moved to another episode number by using the arrow keys 16 (FIG. 2) of the remote controller 13. When the cursor 113 is positioned for one of the first to the third episode that can be dubbed, as is shown in FIG. 19B, the cursor 113 can be moved to a "dubbing" button 114 by using the arrow keys 16 of the remote controller 13. When the enter key 17 of the remote controller 13 is manipulated, the display is shifted to the dubbing contents confirmation screen 92 shown in FIG. 15, so that, as is described above, the contents of dubbing and the CM skip can be confirmed. Thereafter, the dubbing operation is performed in the dubbing mode designated on the dubbing contents confirmation screen 92.

As is described above, in this embodiment, before a program is recorded, not only the recording condition but also the dubbing condition can be designated and stored, and when the dubbing is started, the pertinent dubbing condition is read and employed. When a user desires to store, on a removable recording medium, a desired program on a program table, recording of the program is required, and unattended recording (recording condition) is therefore designated. At this time, unattended dubbing and the dubbing condition can also be designated, so that designation of unattended dubbing for a program to be stored is not missed. Furthermore, for a program pack, unattended recording and unattended dubbing need only be designated for the first program in a series, so that unattended recording and unattended dubbing that are designated are applied for all the remaining programs in the series. Therefore, the unattended recording and unattended dubbing operation for the same contents, such as the same title and the same time slot, need not be repeated.

In the above explanation, various operations have been performed by the remote controller 13; however, an operating unit may be provided for the recorder 1 (FIG. 1) with a dubbing function, and may be employed to perform the same operations.

The embodiment of the present invention has been explained. However, after a user plays and watches programs that were recorded on the HDD 7 without the unattended dubbing being designated, he or she may desire dub some of the programs and store them. Further, a user may desire to cancel unattended dubbing for some recorded programs for which the unattended dubbing has been designated. Thus, in this embodiment, the designation of the dubbing condition for a recorded program (setup of unattended dubbing), shifting of a recorded program, and cancellation of unattended dubbing of a recorded program (unattended dubbing cancellation) are also enabled. These operations will now be described.

(a) Setup of a Dubbing Condition for a Recorded Program:

In this case, a "dubbing enabled program" tag 90*b* is selected on the dubbing setup screen 89 in FIG. 14. Then, the controller 4 in FIG. 4 examines the recorded program information 69 in FIG. 11 that is stored in the information storage unit 6, and finds a recorded program for which unattended dubbing is not designated. Then, the controller 4 adds the thus obtained recorded program as a dubbing enabled program to a dubbing enabled program list, and displays a dubbing enabled program list screen 120 shown in FIG. 20.

Figure 20:
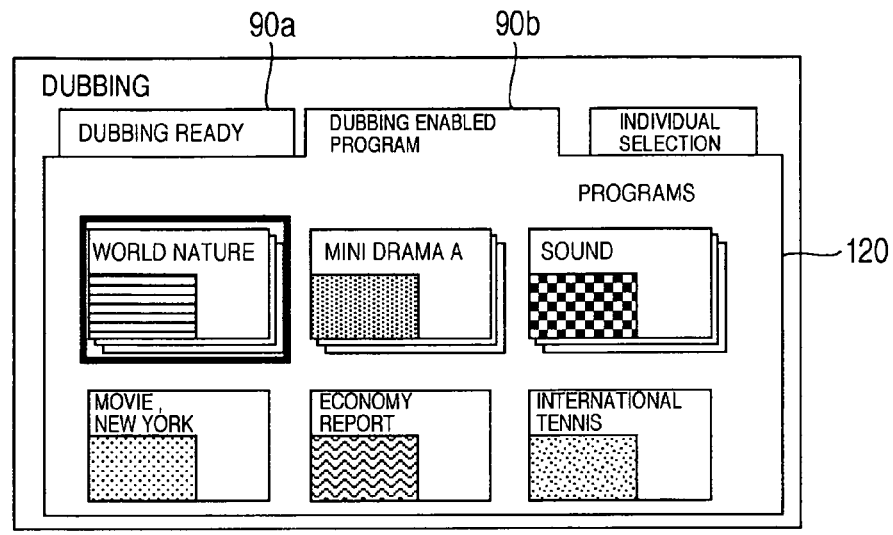
FIG. 20 is a diagram showing an example dubbing available program list screen displayed on the monitor of the DVD recorder equipped with a hard disk shown in FIG. 1.
Figure 21:
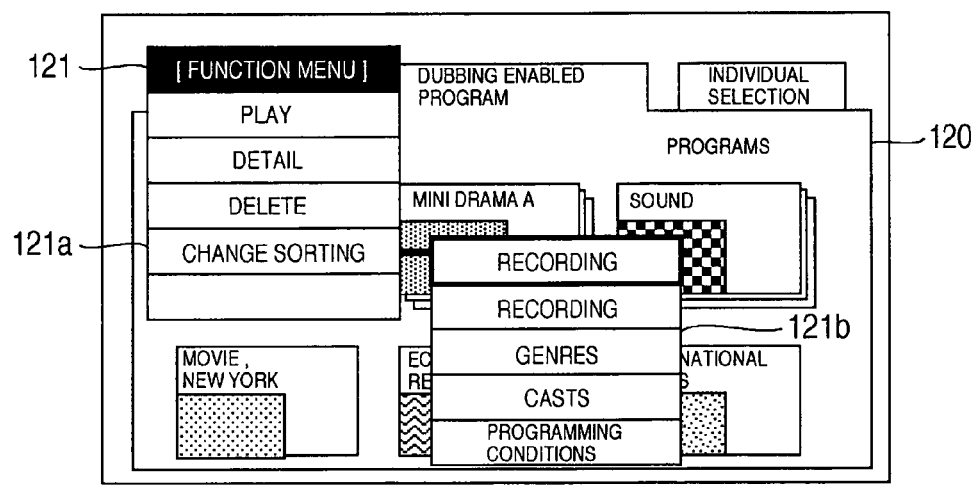
FIG. 21 is a diagram showing an example function menu displayed on the dubbing available program list screen shown in FIG. 20.

On the dubbing enabled program list screen 120, the individual programs are displayed as the initial display (in this case, dubbing enabled programs included in the same program pack are displayed as a group). However, the classification type can be changed. That is, when the function menu button 18 of the remote controller 13 is manipulated while the dubbing enabled program list screen 120 in FIG. 20 is displayed, a function menu screen 121 is displayed over the screen 120, as is shown in FIG. 21. Various functions are included in the function menu, and for one function "change classification", a sub-menu 121*a* is provided that is related to classification, such as "programs", "recording", "genres", "casts" and "programming conditions". When one of the items on the sub-menu 121*a* is selected, the classification of the dubbing enabled programs can be changed on the dubbing enabled program list screen 120.

Figure 22:
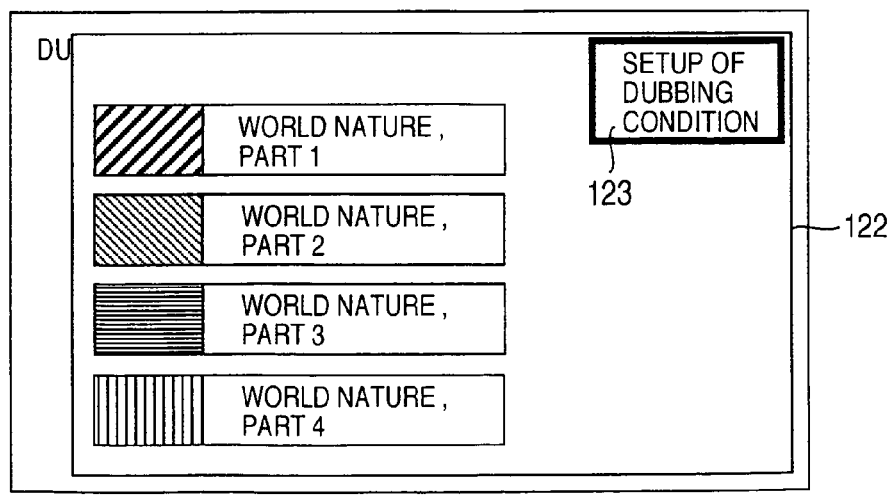
FIG. 22 is a diagram showing an example selected dubbing available program screen displayed on the monitor of the DVD recorder equipped with a hard disk shown in FIG. 1.

When one program or one program pack is selected on the list of the dubbing enabled program list screen 120 by the selection and execution operation of the remote controller 13, a selected dubbing enabled program screen 122 in FIG. 22 is displayed on the monitor. The dubbing enabled program that is selected on the dubbing enabled program list screen 120 in FIG. 20 is displayed by the same method as for the selected recorded program screen 112 in FIG. 19, and the recorded program for which unattended dubbing is to be designated can be confirmed. After the confirmation, a "dubbing condition setup" button 123 is selected by the selection and execution operation of the remote controller 13, and the dubbing condition template list screen 57 in FIG. 8 is displayed on the monitor. Then, in the same manner as previously described, the dubbing condition for the dubbing enabled program is designated on the unattended dubbing setup screen 60 in FIG. 9. Thereafter, when the "setup save" button 62 is selected by the selection and execution operation of the remote controller 13, the designation of unattended dubbing is completed.

Figure 23:
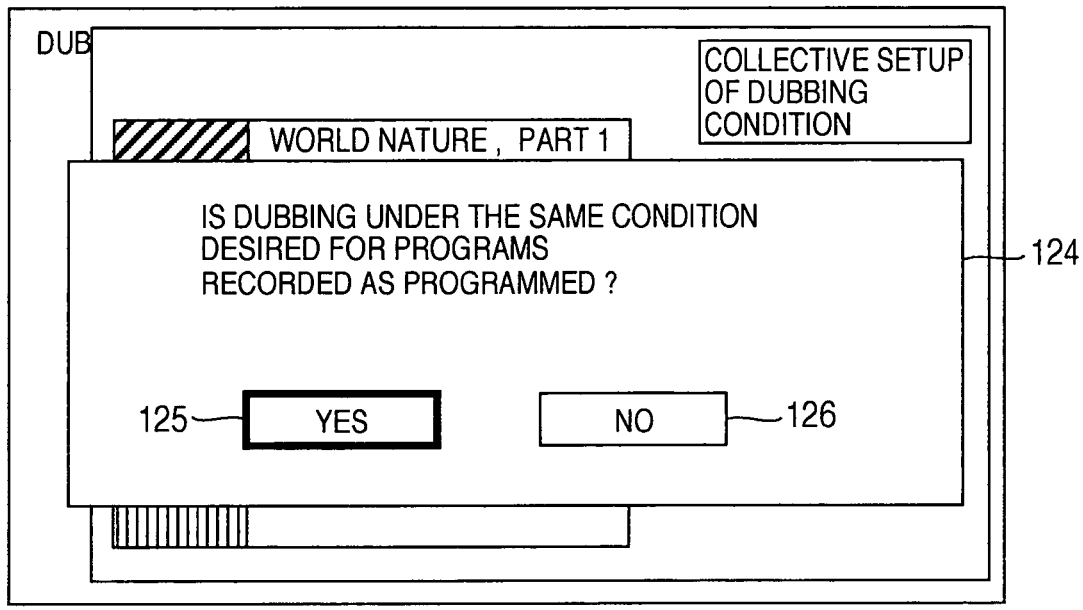
FIG. 23 is a diagram showing an example inquiry screen displayed on the monitor of the DVD recorder equipped with a hard disk shown in FIG. 1.

When a program for which unattended dubbing is designated belongs to a program pack, as is shown in FIG. 23, an inquiry screen 124 is displayed on the monitor to ask whether a designated dubbing condition may be provided for the programs that belong to the program pack and are to be recorded. When a "Yes" button 125 is selected, the same dubbing condition is designated for programs that have the same programming ID and are to be recorded, and unattended dubbing is automatically set. When a "No" button 126 is selected, the dubbing condition is not designated for the programs that have the same programming ID and are to be recorded.

Figure 24:
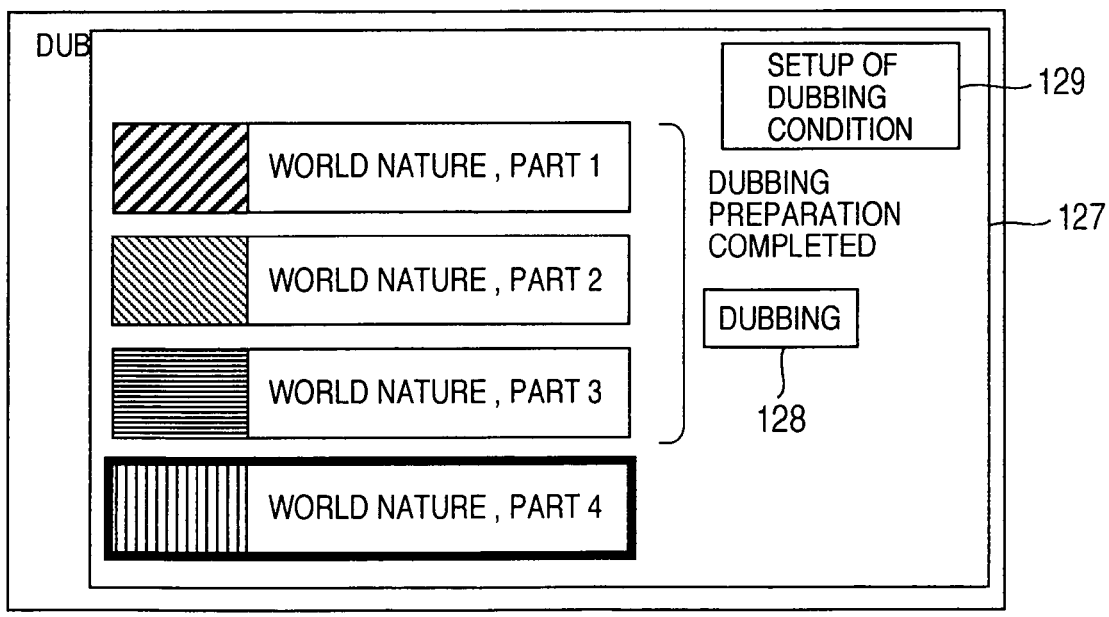
FIG. 24 is a diagram showing an example dubbing standby notification screen displayed on the monitor of the DVD recorder equipped with a hard disk shown in FIG. 1.

Assume that, when the dubbing condition is designated on the unattended dubbing setup screen 60 in FIG. 9 for the selected dubbing enabled program that is displayed on the selected dubbing enabled program screen 122 in FIG. 22, a DVD having a capacity enough to dub this program is already loaded into the dubbing unit 8 in FIG. 1 and the dubbing operation is enabled. In this state, when the "dubbing condition setup" button 123 is selected on the selected dubbing enabled program screen 122 in FIG. 22 by the selection and execution operation of the remote controller 13, or when the "Yes" button 125 is selected on the inquiry screen 124 by the selection and execution operation of the remote controller 13 (the dubbing enabled program for which the dubbing condition is designated is a program pack), a dubbing standby notification screen 127 in FIG. 24 is displayed on the monitor.

As well as on the selected recorded program screen 112 in FIG. 19, the names of dubbing enabled programs for which the dubbing condition is designated and a "dubbing" button 128 are provided on the dubbing standby notification screen 127. A "dubbing condition setup" button 129 is additionally provided. When the "dubbing" button 128 is selected by the selection and execution operation of the remote controller 13, the dubbing contents confirmation screen 92 in FIG. 15 is displayed, and when the "dubbing start" button 95 is selected, the dubbing operation can be performed in th above described manner. Naturally, when "Yes" is designated at the "CM skip" box 94*b*, the "CM skip preview" box 94*c* need only be selected, so that the CM skip can be confirmed or changed as explained while referring to FIG. 17. When a "dubbing condition setup" button 129 is selected on the dubbing standby notification screen 127 in FIG. 25, the received program screen 30 shown in FIG. 3 is displayed.

As is described above, for a program that was recorded on the HDD 7 without the dubbing condition being designated, the dubbing condition can be designated after the program recorded on the HDD has been played and watched, so that the program can be regarded as the recorded program for which unattended dubbing is designated. At this time, when a DVD having a capacity enough to dub this program is set in the dubbing unit 8, the dubbing of the program can be immediately performed.

(b) Moving of Recorded Program:

There are some recorded programs having different titles that should be collected in a group because of their contents. In this embodiment, a specific recorded program is moved and combined with the other recorded program so as to form a program pack. When the specific recorded program is a program pack, the other recorded program is moved to the program pack to be combined.

Figure 25A:
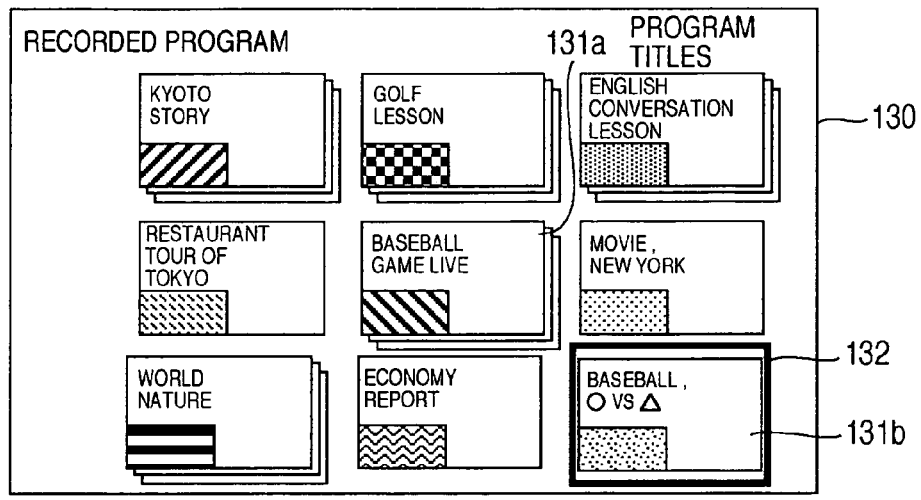
FIGS. 25A to 25C are diagrams showing an example operation performed by the DVD recorder equipped with a hard disk shown in FIG. 1 to move a recorded program.

When the recorded program button 20 of the remote controller 13 in FIG. 2 is manipulated, as is shown in FIG. 25A, a recorded program list screen 130, as well as the recorded program list screen 108 in FIG. 18, is displayed on the monitor. Assume that, on the recorded program list screen 130, recorded programs are displayed in accordance with program titles, and that a recorded program 131*a* with program title "baseball live broadcast" and a recorded program 131*b* with program title "baseball X versus XX" are included as recorded programs. Since the recorded program 131*b* is a professional baseball live broadcast, this program 131*b* falls in the same category as the recorded program 131*a* having program title "baseball live broadcast", and should be included in the recorded program 131*a*. The operation for moving a recorded program is performed in this case, i.e., the recorded program 131*b* is moved and combined with the recorded program 131*a*.

Figure 25B:
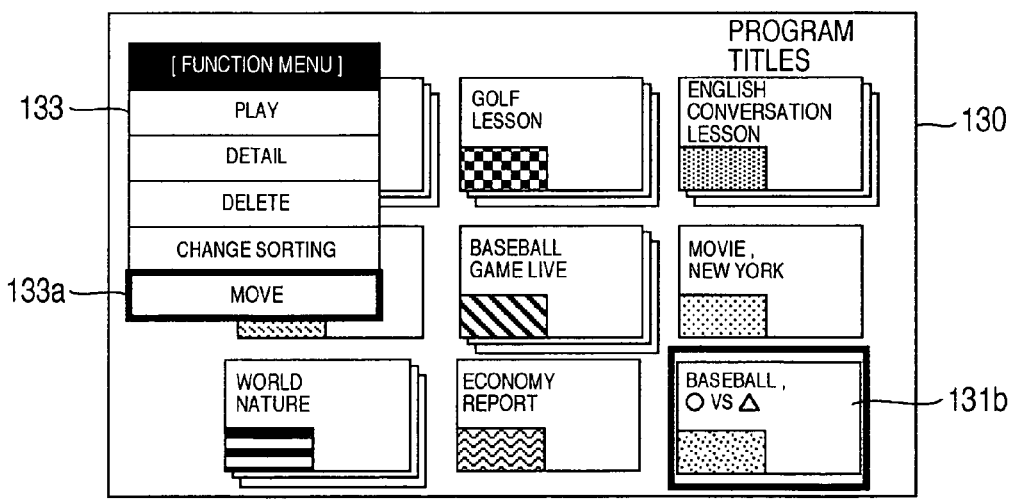
Figure 25C:
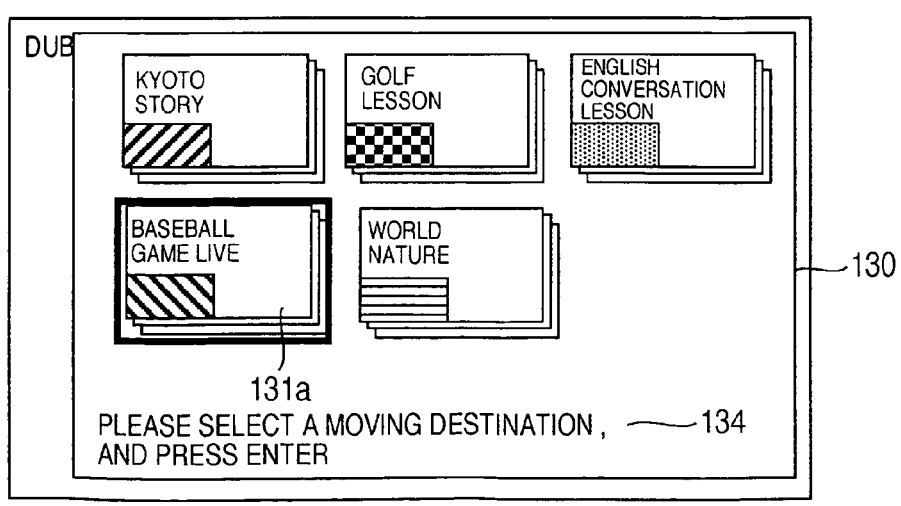

For this operation, on the recorded program list screen 130, a cursor 132 in a box shape is moved to the recorded program 131*b* by using the arrow keys 16 of the remote controller 13, and the function menu button 18 in FIG. 2 is manipulated. Then, as is shown in FIG. 25B, a function menu screen 133 is displayed over the recorded program list screen 130. When a menu item "move" 133*a* is selected on the function menu screen 133 by the selection and execution operation of the remote controller 13, the display is returned to the recorded program list screen 130, and an instruction message 134, such as "Please select a moving destination and press an enter key", is displayed. When the recorded program 131*a* is selected as the moving destination by the selection and execution operation of the remote controller 13, the recorded program 131*b* is moved to the recorded program 131*a*, so that a program pack having program title "baseball live broadcast" is formed.

At this time, when the dubbing condition is already designated at least for either the recorded program 131*a* or 131*b*, the same dubbing condition is applied for the thus obtained program pack.

(c) Cancellation of Unattended Dubbing:

Among programs that were recorded on the HDD 7 with both unattended recording and unattended dubbing being designated, there are some recorded programs for which cancellation of unattended dubbing is desired, or dubbing is not necessary after the programs are played and watched. In this embodiment, cancellation of unattended dubbing is enabled.

As previously described, when the menu screen 85 in FIG. 13 is displayed by using the menu button 15 of the remote controller 13, and the "dubbing" item 86*c* is selected, the dubbing setup screen 89 in FIG. 14 is displayed on the monitor. The "dubbing ready" tag 90*a* is currently selected on the dubbing setup screen 89, and a list of recorded programs for which unattended dubbing is designated is displayed (the list may be displayed by the method shown in FIG. 25).

When a recorded program (a program pack if the desired program is included in the program pack) for which unattended dubbing is desired to be canceled is selected on the dubbing setup screen 89 by the selection and execution operation of the remote controller 13, as is shown in FIG. 27A, an unattended dubbing canceled program screen 140 is displayed on the monitor to represent a recorded program that is selected. In this case, the recorded program that is selected forms a program pack, and as well as on the selected recorded program screen 112 in FIG. 19, the individual recorded programs of the program pack are sorted for every set for dubbing. A cursor 141 in a box shape is provided on the unattended dubbing canceled program screen 140, and using the cursor 141, one of the recorded programs can be selected by the selection and execution operation of the remote controller 13.

Figure 26A:
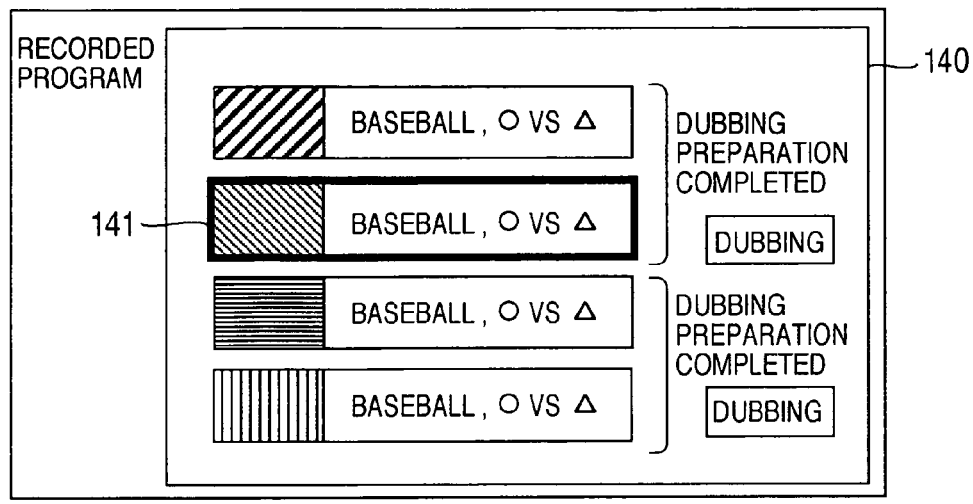
FIGS. 26A to 26C are diagrams showing an example operation performed by the DVD recorder equipped with a hard disk shown in FIG. 1 to cancel a dubbing setting for a recorded program.

When the cursor 141 is moved to the recorded program for which unattended dubbing is desired to be canceled and when the function menu button 18 of the remote controller 13 in FIG. 13 is manipulated, as is shown in FIG. 26A, a function menu screen 142 is displayed over the unattended dubbing canceled program screen 140. When a "cancel dubbing" item 142a on the function menu is selected by the selection and execution operation of the remote controller 13, as is shown in FIG. 26C, the unattended dubbing for the recorded program that has been selected by using the cursor 141 in the state in FIG. 26A, and an unattended dubbing cancellation mark 143 is provided for this program.

Figure 26B:
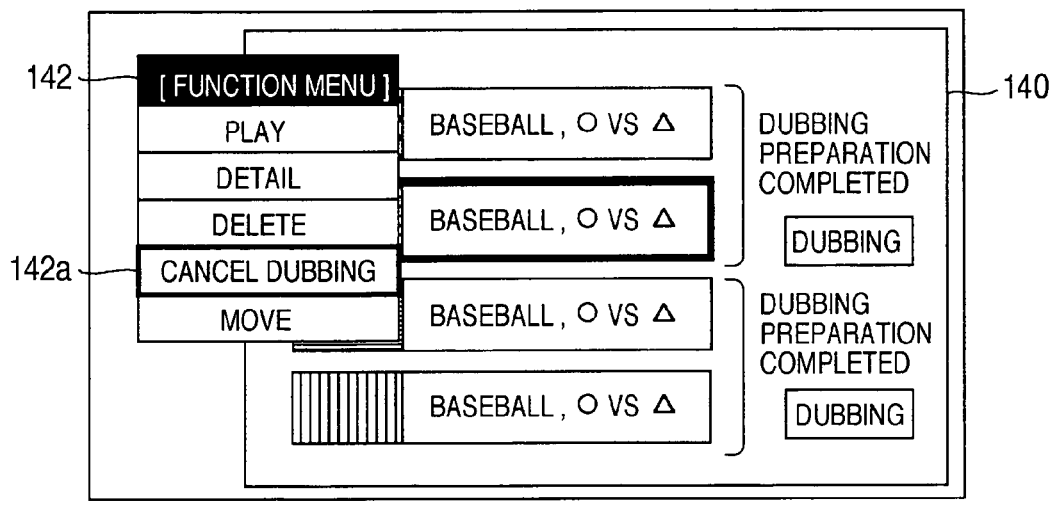
Figure 26C:
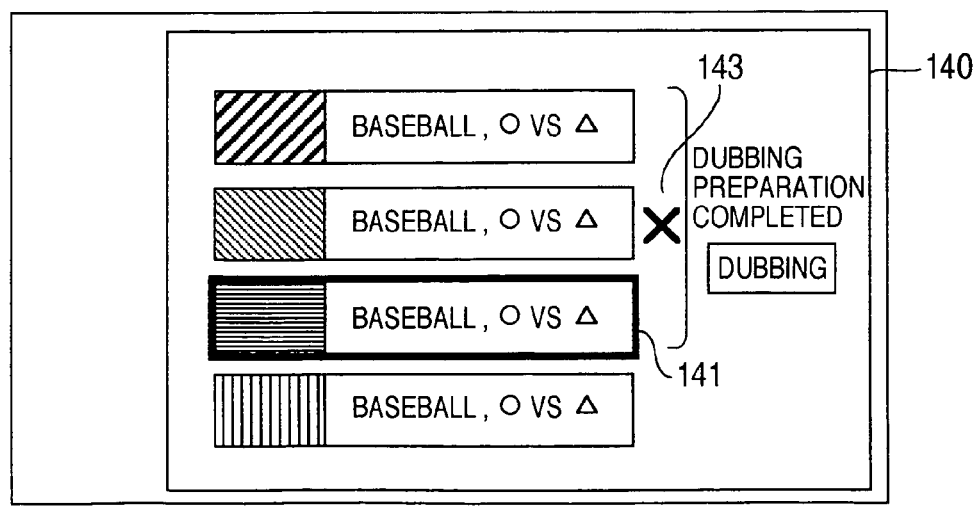

Further, when there is a recorded program for which cancellation of unattended dubbing is desired, on the unattended dubbing canceled program screen 140 in FIG. 26C, the pertinent recorded program is selected by the selection and execution operation of the remote controller 13, and the above described process is repeated.

In this manner, unattended dubbing can be canceled for each recorded program that constitutes the program pack. For independent recorded programs, only the recorded program is displayed on the unattended dubbing canceled program screen 140, and the cursor 141 is not displayed.

Figure 27:
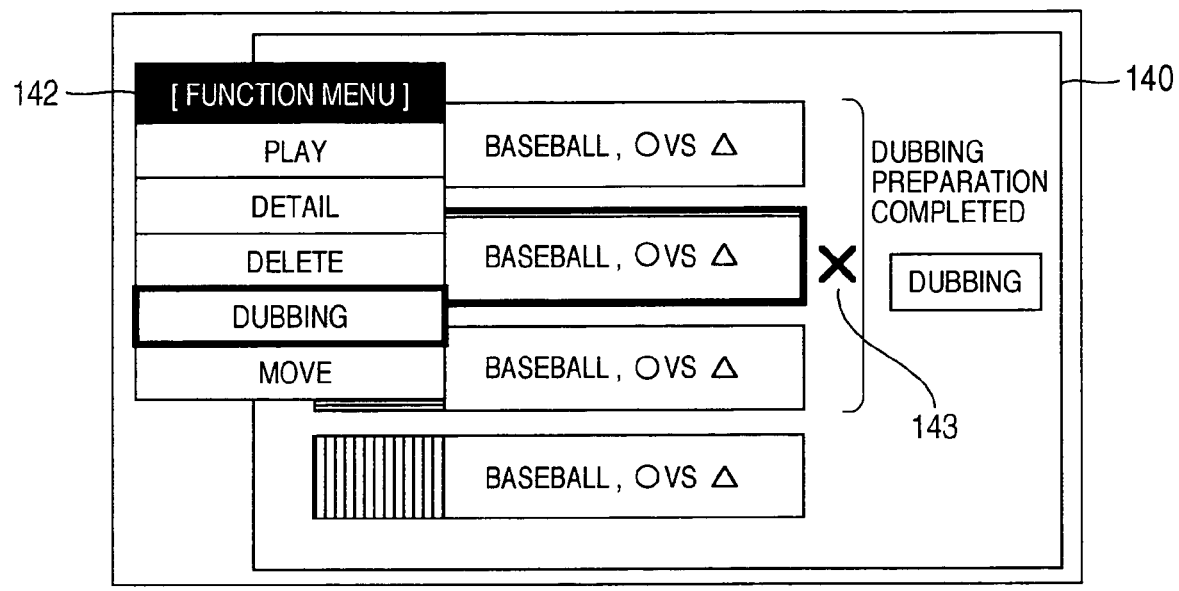
FIG. 27 is a diagram showing an example operation performed by the DVD recorder equipped with a hard disk shown in FIG. 1 to reset the dubbing of a recorded program.

Unattended dubbing can also be recovered for a recorded program for which unattended dubbing is canceled in the manner as explained while referring to FIGS. 26A to 26C. In this case, the recorded program with the unattended dubbing cancellation mark 143 shown in FIG. 26C is selected by the selection and execution operation of the remote controller 13, and the function menu button 18 of the remote controller 13 is manipulated. Then, as is shown in FIG. 27, the function menu screen 142 is displayed, and when the "dubbing" item on the menu is selected by the selection and execution operation of the remote controller 13, the original dubbing condition is provided again for the recorded program. Thus, the setup of unattended dubbing is completed, and the unattended dubbing cancellation mark 143 disappears.

Therefore, on the list of recorded programs for which unattended dubbing is designated and the "dubbing ready" tag 90a is selected on the dubbing setup screen 89, the recorded program for which the designated unattended dubbing is canceled is displayed with the unattended dubbing cancellation mark 143.

The function menu screen 142 in FIGS. 26B and 27 include both "cancel dubbing" and "dubbing" items, and only the necessary item is shown in FIGS. 26B and 27. However, as is shown in FIG. 26B, when the cursor 141 is located at the recorded program for which unattended dubbing is to be canceled, the "cancel dubbing" item may be included on the function menu screen 142, and as is shown in FIG. 27, when the cursor 141 is located at the recorded program for which unattended dubbing is designated again, the "dubbing" item may be included.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recorder with a dubbing function comprising:
a tuner for receiving program information including broadcasting programs;
a control signal receiver for receiving control signals;
an image data preparation unit for decoding the broadcasting programs received by the tuner;
a hard disk drive including a hard disk, the hard disk drive being capable of recording and reproducing information to and from the hard disk;
the broadcasting programs decoded by the image data preparation unit being recorded on the hard disk by the hard disk drive;
a dubbing unit for dubbing, to a removable recording medium, the broadcasting programs recorded on the hard disk by the hard disk drive;
an information storage unit for storing programming information for an unattended recording or an unattended dubbing; and
a controller for controlling the tuner, the control signal receiver, the image data preparation unit, the hard disk drive, the dubbing unit and the information storage unit,
wherein, based on a control signal received by the control signal receiver, the controller determines a recording condition for recording, on the hard disk, a recording scheduled broadcasting program selected from all the broadcasting programs received by the tuner, and prepares and stores the programming information for the unattended recording for the recording scheduled program that is selected into the information storage unit,
wherein, for the recording scheduled program designated in the programming information, the controller determines a dubbing condition for dubbing the recording scheduled program from the hard disk to the removable recording medium, and prepares and stores the programming information for unattended dubbing into the information storage unit,
wherein, for unattended recording, the controller enables setup of the recording condition collectively for a series of recording scheduled broadcasting programs that are included in a recording schedule broadcasting program pack and that are broadcast with a same title, on a same channel, and at a same time slot each time a predetermined interval has elapsed, and the controller controls the information storage unit to record the programming information for the unattended recording based on an operation signal for collectively recording the series of recording scheduled broadcasting programs together,
wherein, for unattended dubbing, the controller enables setup of the dubbing condition so that the series of programs that form the program pack are divided into sets of a predetermined number of programs, the dubbing unit dubs the programs in the same set onto the same removable recording medium, and said controller controls the information storage unit to record the programming information for the unattended dubbing based on an operation signal for setup of the dubbing condition,
wherein, in a case that the controller set the dubbing condition that the series of programs forming the program pack are divided into sets of a predetermined number of programs and the programs in the same set are to be dubbed into the same removable recording medium, when the predetermined number of programs of the same set has been recorded into the hard disk, dubbing setup information is produced by the controller and the controller allows dubbing of programs identified with numbers included in the dubbing setup information.

2. A recorder according to claim 1, wherein, for unattended recording, setup of the recording condition is enabled, so that numbers representing a recording order are provided for the series of programs that form the program pack.

3. A recorder according to claim 1, wherein a recorded program list is displayed on a display screen, the recorded program list indicating broadcasting programs on the hard disk by the hard disk drive based on said recording condition of the unattended recording, and a dubbing ready complete mark is displayed to be attached to the recorded programs which are allowed to be dubbed and identified with numbers included in the dubbing setup information.

4. A recorder according to claim 1, wherein a dubbing condition template list previously registered including a plurality of conditions is displayed on a display screen, the dubbing condition as desired is selected from the plurality of conditions in the list.

* * * * *